(12) United States Patent
Goto et al.

(10) Patent No.: US 7,936,739 B2
(45) Date of Patent: May 3, 2011

(54) BASE STATION, A MOBILE STATION, A RADIO COMMUNICATIONS SYSTEM, AND A RADIO TRANSMISSION METHOD USING SPREAD SPECTRUM AND CHIP REPETITION

(75) Inventors: Yoshikazu Goto, Yokosuka (JP); Hiroyuki Atarashi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 641 days.

(21) Appl. No.: 11/071,195

(22) Filed: Mar. 4, 2005

(65) Prior Publication Data

US 2005/0276242 A1 Dec. 15, 2005

(30) Foreign Application Priority Data

Mar. 5, 2004 (JP) ................................. 2004-063179

(51) Int. Cl.
*H04B 7/216* (2006.01)
(52) U.S. Cl. ........ 370/342; 375/130; 375/140; 375/141; 375/146; 455/67.11
(58) Field of Classification Search .................. 370/206, 370/252, 320, 335, 342, 208; 375/130, 295, 375/140, 141, 367, 146; 455/517, 561
See application file for complete search history.

(56) References Cited

U.S. PATENT DOCUMENTS

| | | | | |
|---|---|---|---|---|
| 4,651,327 | A * | 3/1987 | Fujita ............................. | 375/152 |
| 6,377,606 | B1 | 4/2002 | Toskala et al. | |
| 6,760,321 | B2 * | 7/2004 | Shamsunder ................ | 370/342 |
| 7,369,527 | B2 * | 5/2008 | Heo et al. ..................... | 370/335 |
| 7,372,889 | B2 * | 5/2008 | Atarashi et al. .............. | 375/130 |
| 7,486,638 | B2 * | 2/2009 | Ofuji et al. ................... | 370/329 |

(Continued)

FOREIGN PATENT DOCUMENTS

EP 1 445 873 A2 8/2004

(Continued)

OTHER PUBLICATIONS

Yoshikazu Goto, et al., "Variable Spreading and Chip Repetition Factors (VSCRF)-CDMA in Reverse Link for Broadband Wireless Acces", The 14th IEEE 2003 International Symposium on Personal, Indoor and Mobile Radio Communication Proceedings, vol. 1, XP-010681596, Sep. 7, 2003, pp. 254-259.

(Continued)

*Primary Examiner* — Charles N Appiah
*Assistant Examiner* — Jaime M Holliday
(74) *Attorney, Agent, or Firm* — Oblon, Spivak, McClelland, Maier & Neustadt, L.L.P.

(57) ABSTRACT

A base station, a mobile station, a radio communications system, and a radio transmission method are disclosed. The base station includes a control information determining unit configured to determine control information that includes a spreading factor, the number of chip repetitions, and a phase unique to the mobile station, based on at least one of
  information about the type of cell environments in which the mobile station is present,
  information about the number of mobile stations that are present in the cell,
  information about information rate required by the mobile station,
  information about a type of traffic,
  information about a radio parameter of the mobile station,
  information about a propagation path condition, and
  information about interference from an adjacent cell, and
configured to transmit the spreading factor, the number of chip repetitions, and the unique phase of the mobile station that is determined to the mobile station.

10 Claims, 36 Drawing Sheets

U.S. PATENT DOCUMENTS

| | | | |
|---|---|---|---|
| 7,499,427 B2* | 3/2009 | Padovani et al. | 370/329 |
| 2003/0053413 A1* | 3/2003 | Sawahashi et al. | 370/208 |
| 2004/0008614 A1* | 1/2004 | Matsuoka et al. | 370/203 |
| 2004/0085918 A1* | 5/2004 | Shamsunder | 370/320 |
| 2004/0156386 A1* | 8/2004 | Atarashi et al. | 370/441 |
| 2006/0112744 A1* | 6/2006 | Johnson et al. | 70/226 |
| 2006/0234761 A1* | 10/2006 | Nagasaka | 455/552.1 |

FOREIGN PATENT DOCUMENTS

| | | |
|---|---|---|
| WO | WO 97/30531 | 8/1997 |

OTHER PUBLICATIONS

Hiroyuki Atarashi, et al., "Broadband Packet Wireless Access Appropriate for High-speed and High-Capacity Throughput", IEEE VCT2001—Spring, May 2001, pp. 566-570.

Michael Schnell, et al., "A Promising New Wideband Multiple-Acess Scheme for Future Mobile Communications Systems", European Trans, on Telecommunications (ETT), vol. 10, No. 4, Jul.-Aug. 1999, pp. 417-427.

Een-Kee Hong, et al., "Synchronous Transmission Technique for the Reverse Link in DS-CDMA Terrestrial Mobile Systems", IEEE Transactions on Communications, vol. 47, No. 11, Nov. 1999, pp. 1632-1635.

Kenichi Higuchi, et al., "Multipath Interface Canceller for High-Speed Packet Transmission With Adaptive Modulation and Coding Scheme in W-CDMA Forward Link", IEEE Journal on Selected Areas in Communications, vol. 20, No. 2, Feb. 2002, pp. 419-432.

Anja Klein, "Data Dectection Algorithms Specially Designed for the Downlink of CDMA Mobile Radio Systems", In Proc. IEEE VTC '97, May 1997, pp. 203-207.

David Falconer, et al., "Frequency Domain Equalization for Single-Carrier Broadband Wireless Systems", IEEE Communications Magazine, vol. 40, No. 4, Apr. 2002, pp. 58-66.

* cited by examiner

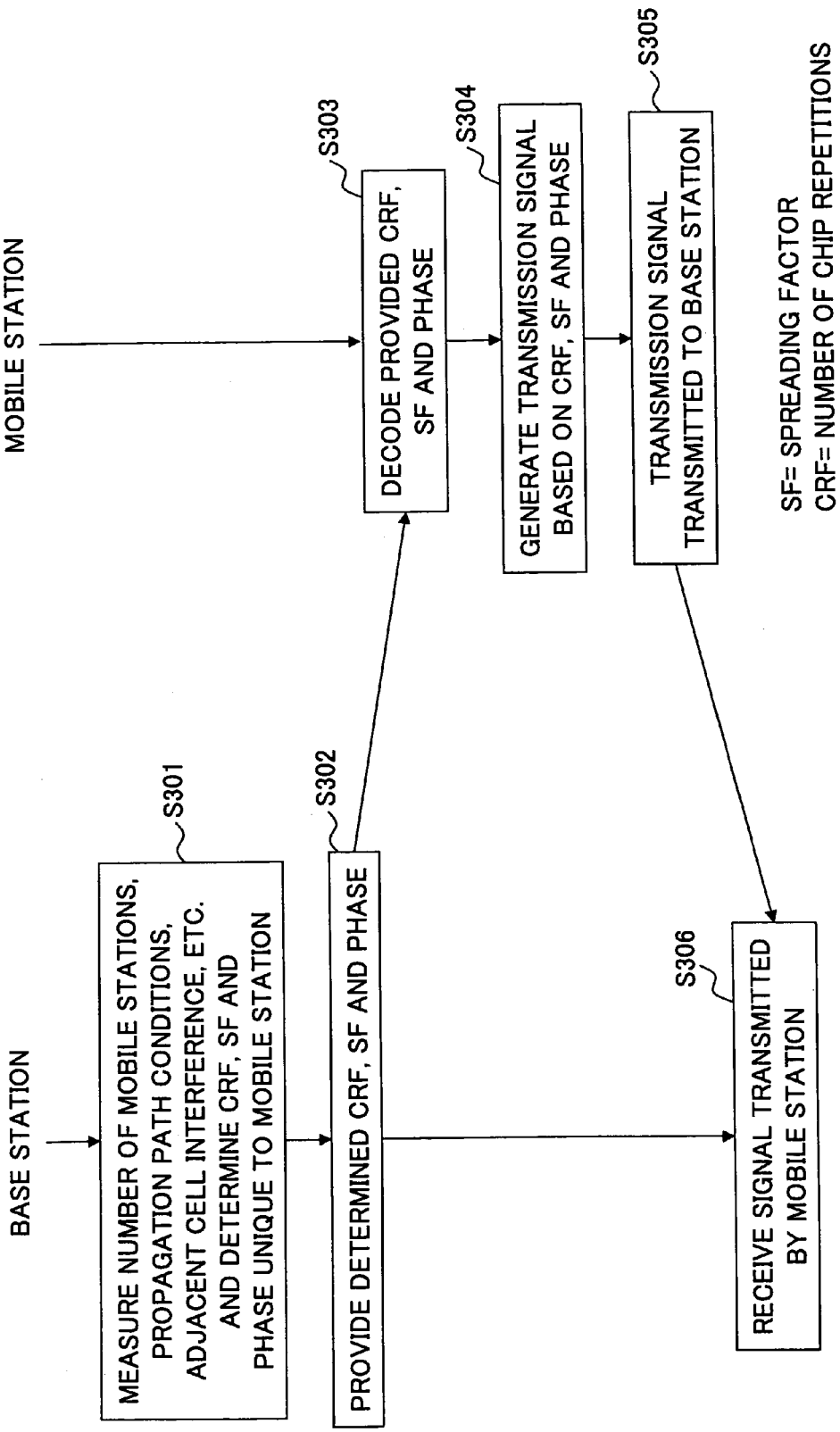

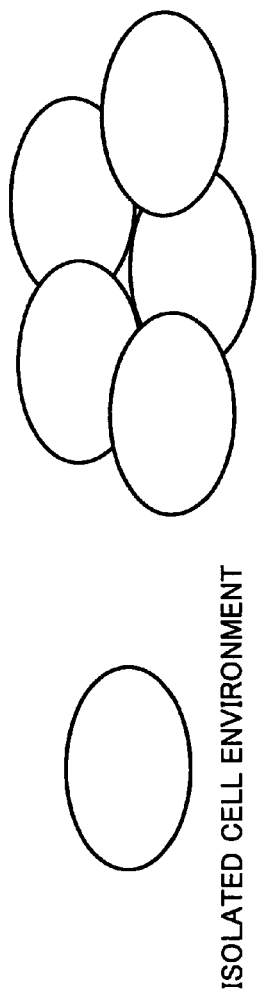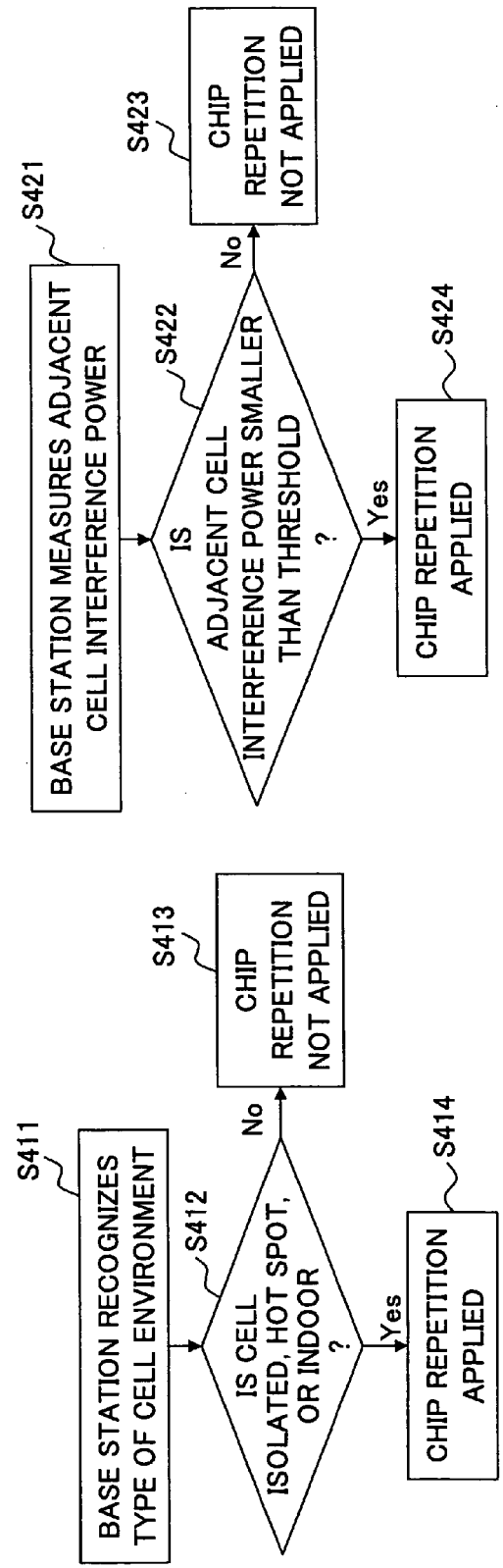
FIG.4A
FIG.4B
FIG.4C

→ FREQUENCY

EXAMPLE: NUMBER OF CHIP REPETITIONS = 4 (FOR ALL CHANNELS A, B, C, AND D)

→ FREQUENCY DOMAIN RADIO RESOURCE EVENLY ASSIGNED

⟶ FREQUENCY

EXAMPLE: NUMBER OF CHIP REPETITIONS = 2 (A)
= 4 (B)
= 8 (C,D)

→FREQUENCY DOMAIN RADIO RESOURCE VARIABLY ASSIGNED

FIG.9A

| NUMBER OF SIMULTANEOUSLY ACCESSING MOBILE STATIONS | 2 | 4 | 8 |
|---|---|---|---|
| CRF (COMMON TO ALL PHYSICAL CHANNELS WITHIN EACH GROUP) | 8 | 8 | 8 |

→ IF NUMBER OF ACCESSING MOBILE STATIONS IS SMALLER THAN CRF, FREQUENCY MULTIPLEX WITHIN MOBILE STATION CARRIED OUT

FIG.9B

| NUMBER OF SIMULTANEOUSLY ACCESSING MOBILE STATIONS | 2 | 4 | 8 |
|---|---|---|---|
| CRF (COMMON TO ALL PHYSICAL CHANNELS WITHIN EACH GROUP) | 2 | 2 | 2 |

→ IF NUMBER OF ACCESSING MOBILE STATIONS IS GREATER THAN CRF, CODE MULTIPLEX BETWEEN MOBILE STATIONS CARRIED OUT

FIG.9C

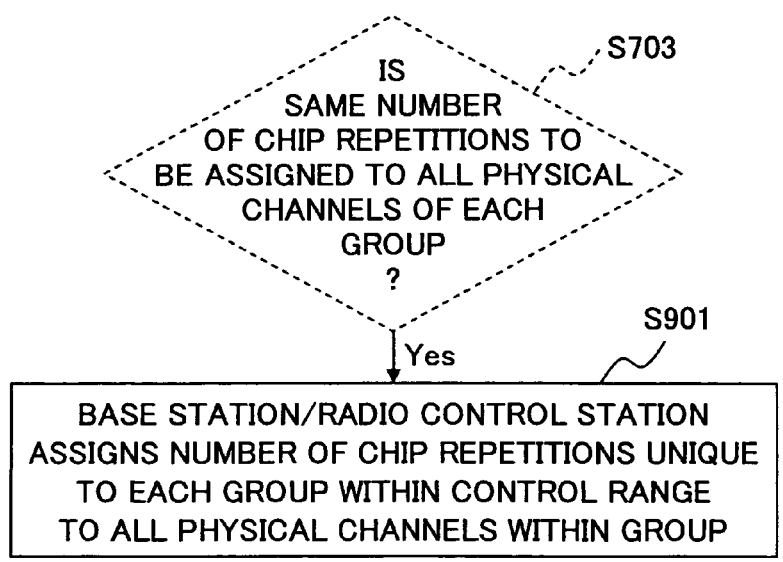

| NUMBER OF SIMULTANEOUSLY ACCESSING MOBILE STATIONS | 2 | 4 | 4 | 8 | 8 |
|---|---|---|---|---|---|
| NUMBER OF SIMULTANEOUSLY ACCESSING HIGH-SPEED INFORMATION RATE MOBILE STATIONS | 2 | 2 | 4 | 4 | 8 |
| CRF (COMMON TO ALL PHYSICAL CHANNELS WITHIN EACH GROUP) | 2 | 2 | 4 | 4 | 8 |

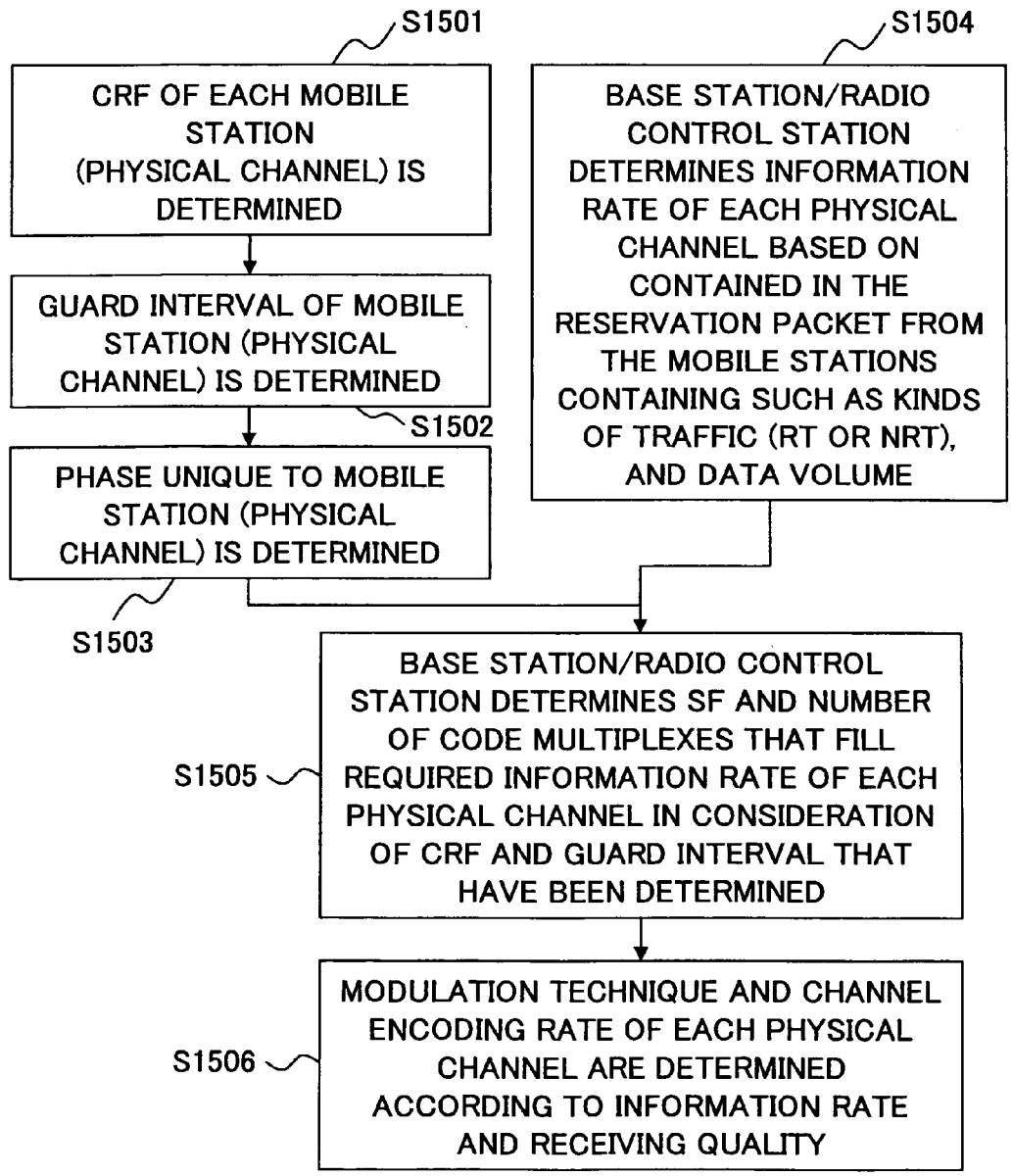

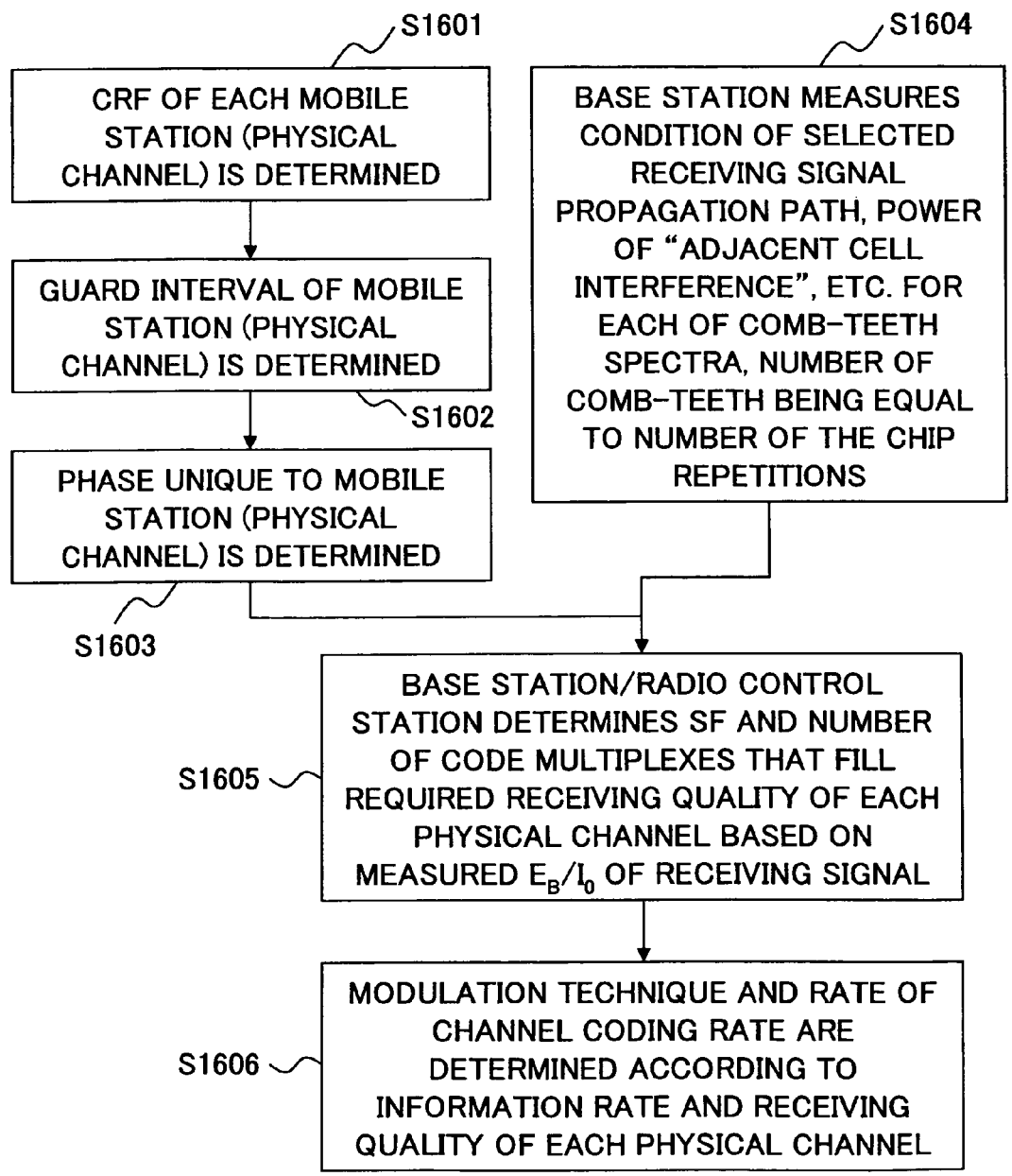

FIG.17A

| INFORMATION RATE | HIGH ⇔ LOW |
|---|---|
| SF | SMALL ⇔ GREAT |
| MODULATION TECHNIQUE | 16QAM ⇔ QPSK |
| ENCODING RATE | GREAT ⇔ SMALL |

FIG.17B

| INTERFERENCE POWER | SMALL ⇔ GREAT |
|---|---|
| SF | SMALL ⇔ GREAT |
| MODULATION TECHNIQUE | 16QAM ⇔ QPSK |
| ENCODING RATE | GREAT ⇔ SMALL |

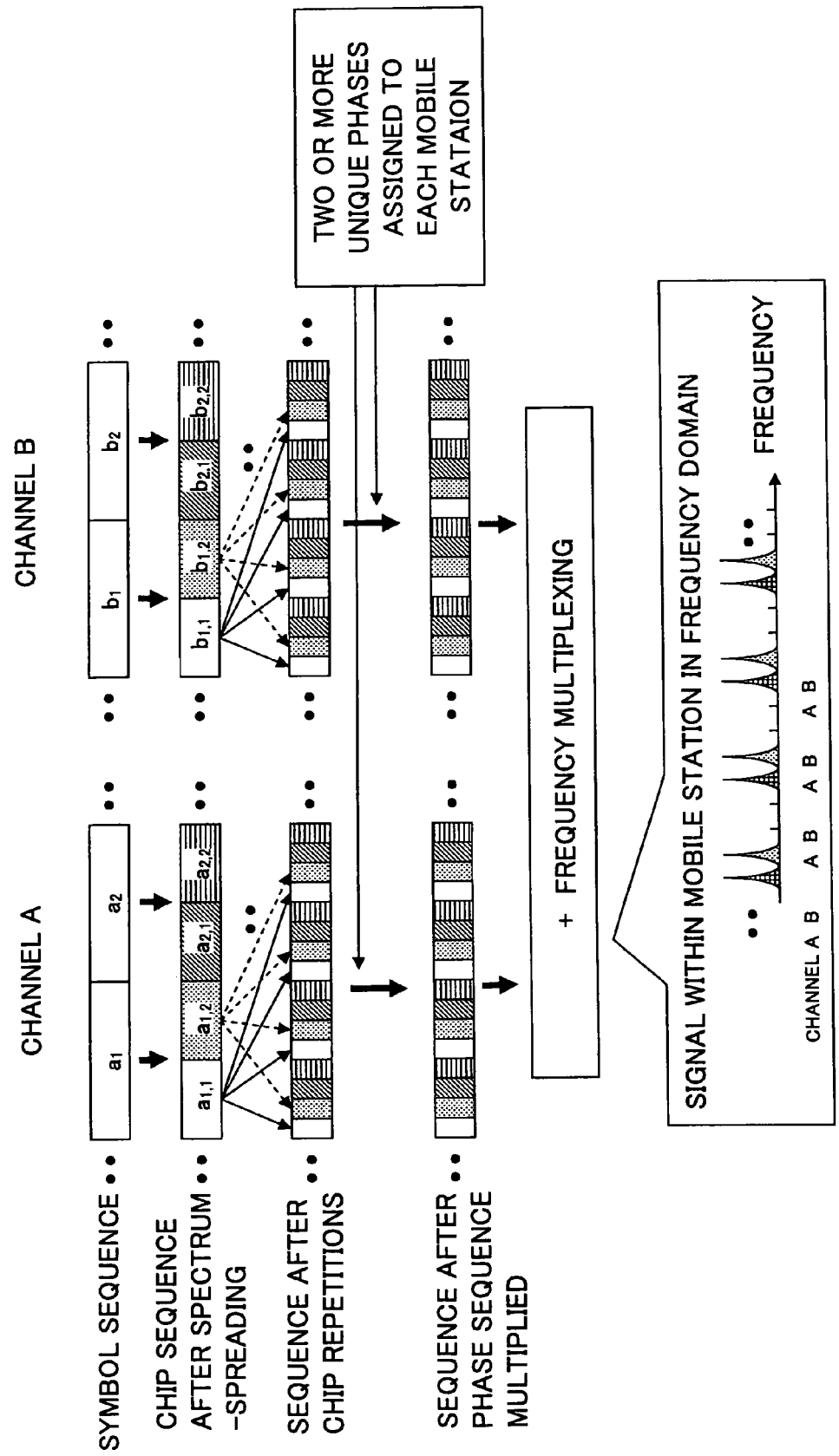

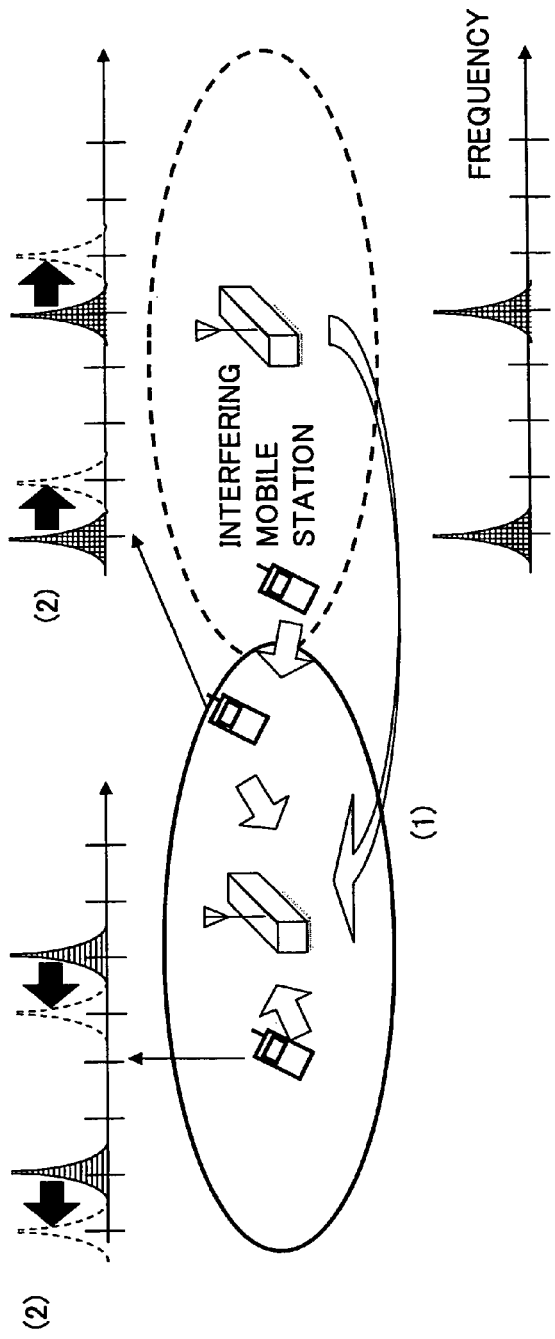

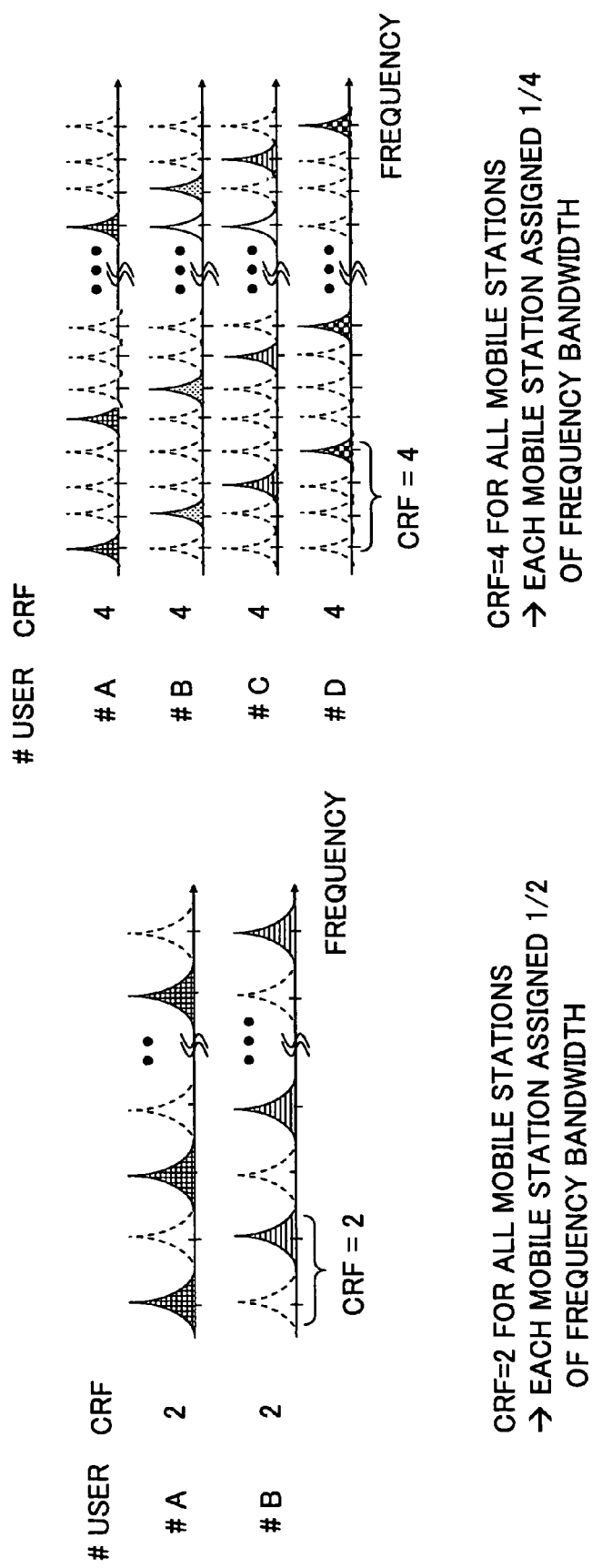

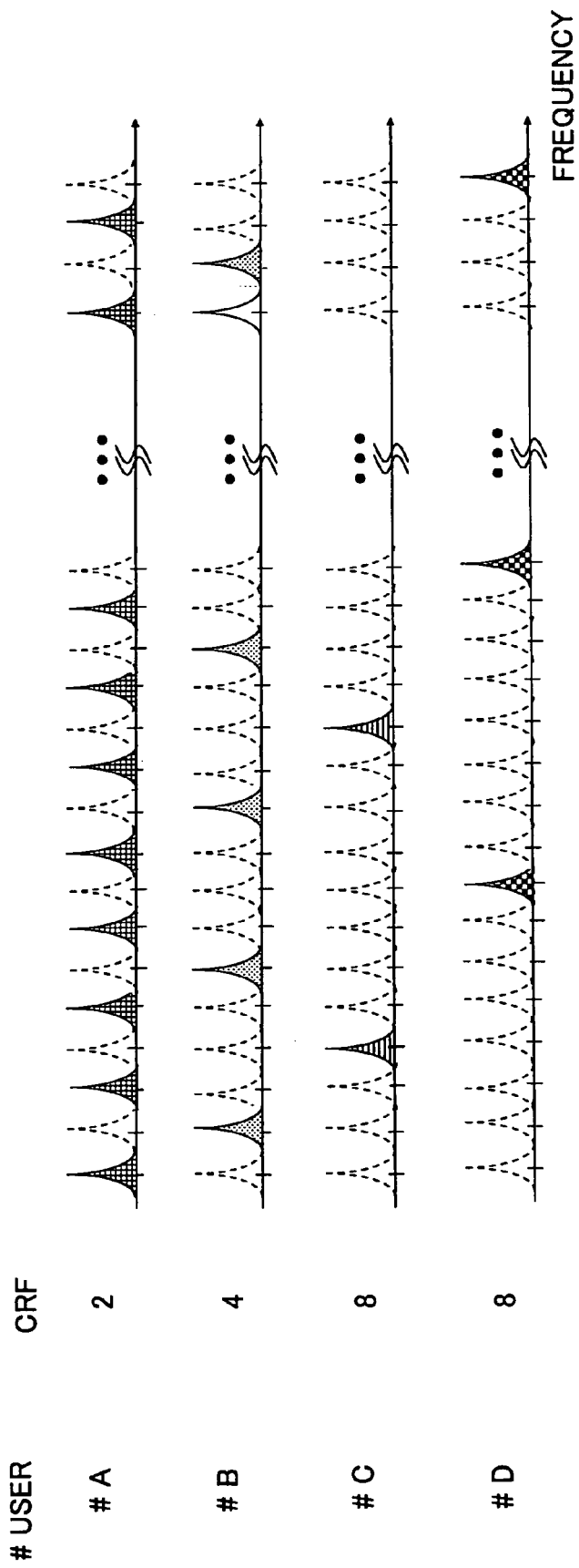

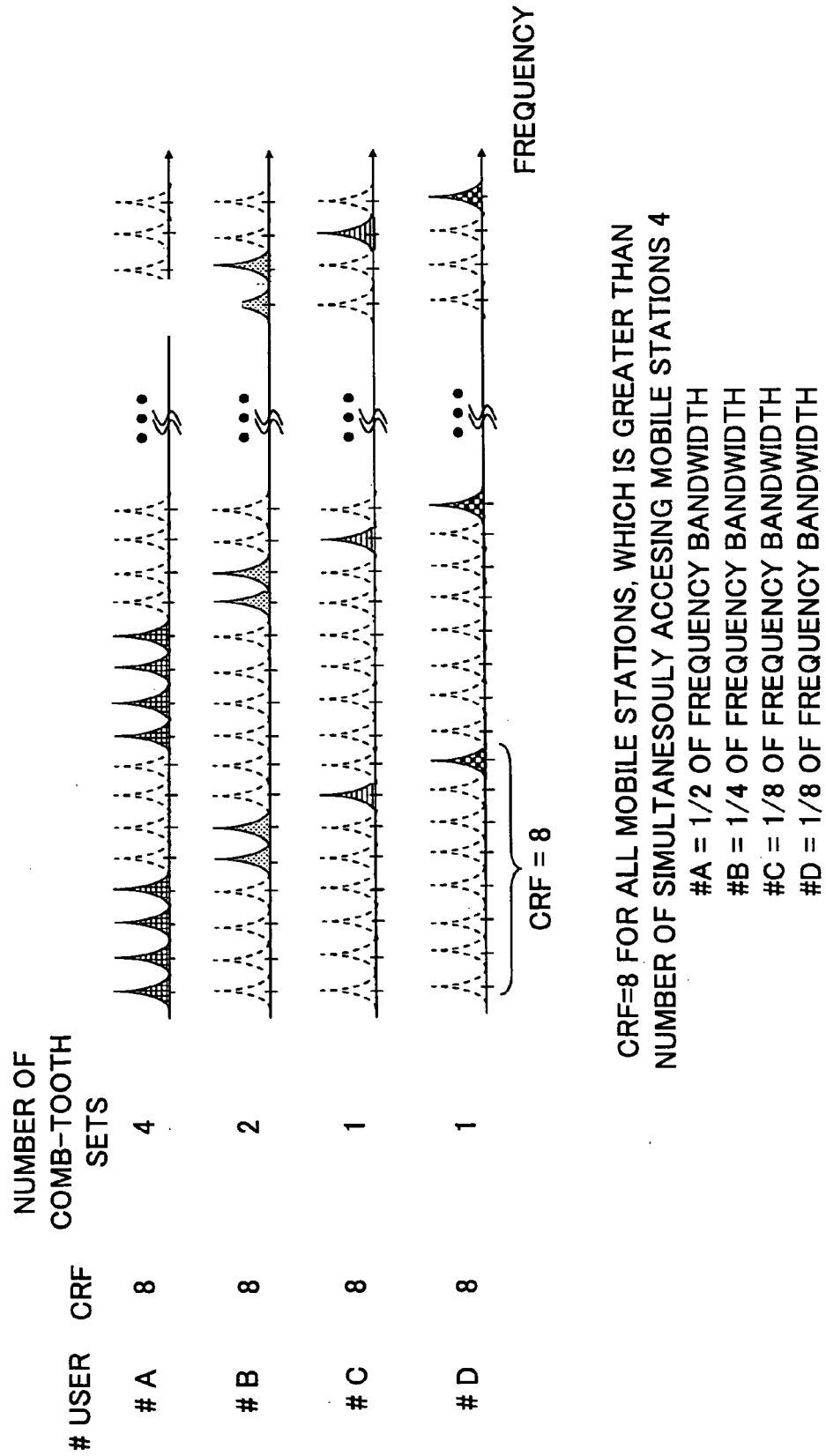

FIG.27A
SMALL CELL RADIUS→ SMALL DELAY SPREAD SMALL
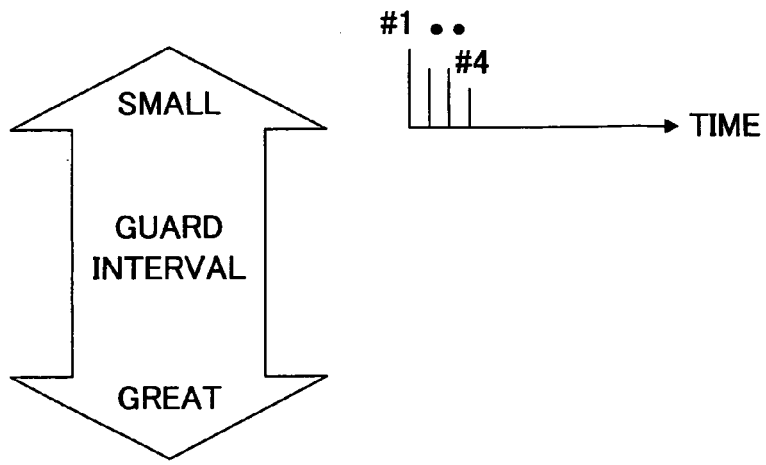
GREAT CELL RADIUS→ GREAT DELAY SPREAD GREAT
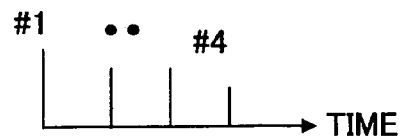
FIG.27B
BASE STATION/RADIO CONTROL STATION RECOGNIZES CELL RADIUS — S2701
GUARD INTERVAL LENGTH CORRESPONDING TO CELL RADIUS IS UNIFORMLY ASSIGNED TO ALL ACCESSING MOBILE STATIONS EVERY FIXED REPETITION PATTERNS (Q X CRF) BASED ON TABLE BEFOREHAND PREPARED — S2702

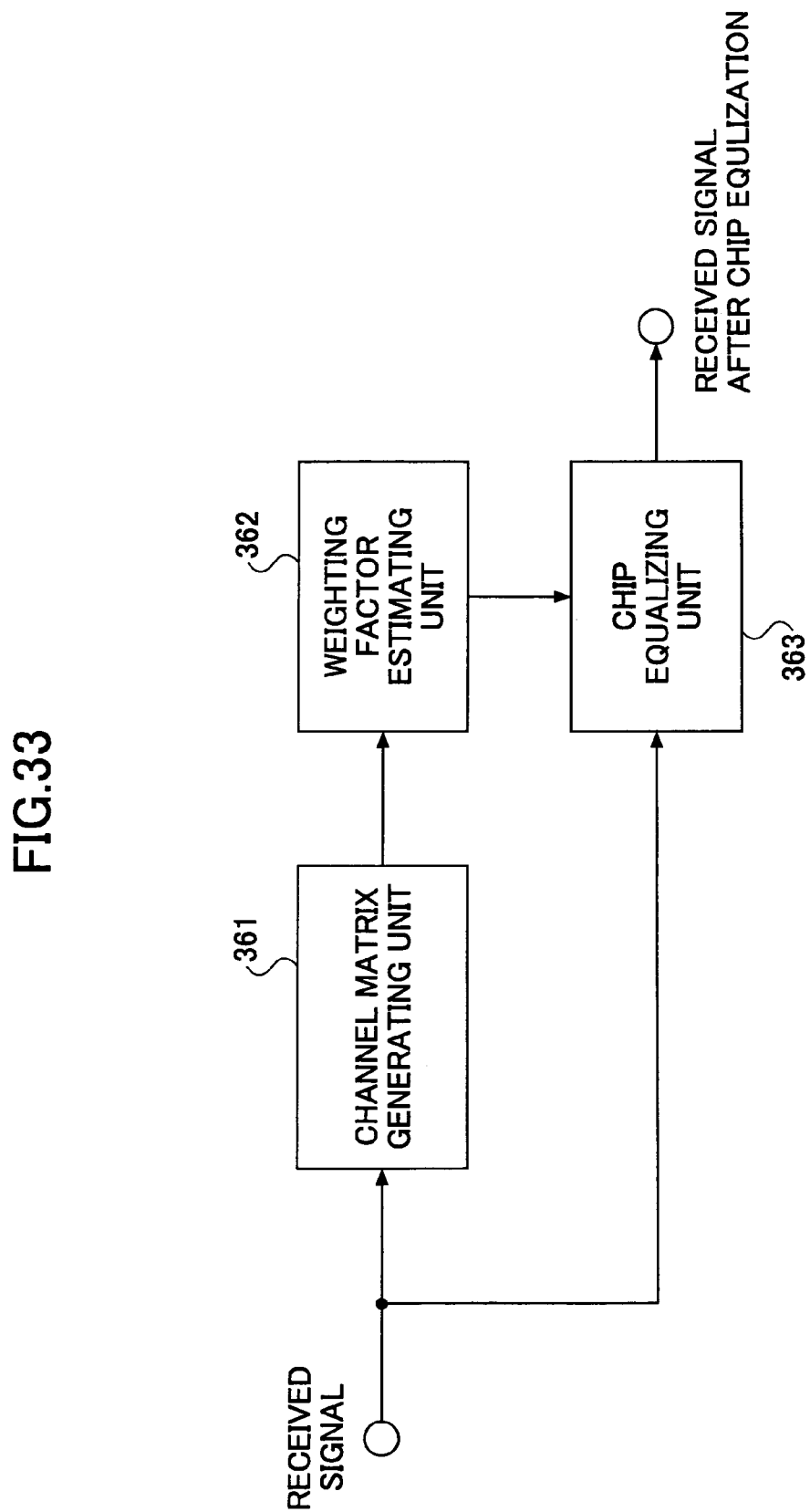

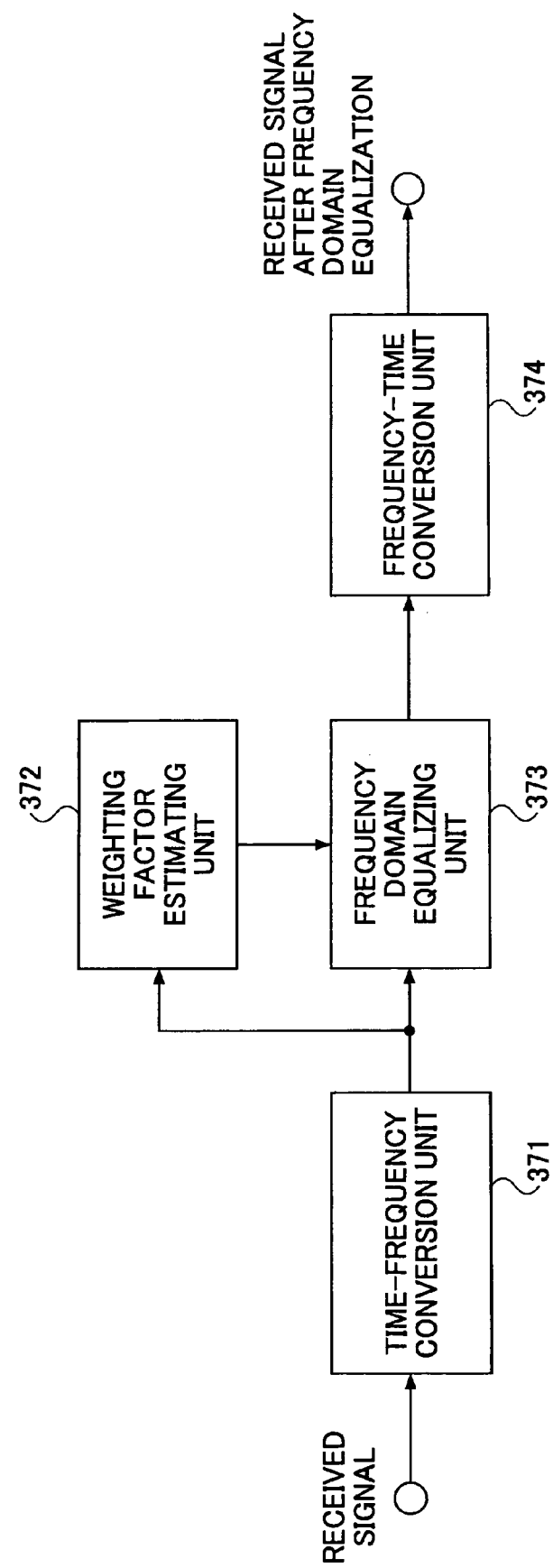

BASE STATION, A MOBILE STATION, A RADIO COMMUNICATIONS SYSTEM, AND A RADIO TRANSMISSION METHOD USING SPREAD SPECTRUM AND CHIP REPETITION

BACKGROUND OF THE INVENTION

1. Field of the Invention

The present invention relates to a base station, a mobile station, a radio communications system, and a radio transmission method that use spread spectrum and chip repetition.

2. Description of the Related Art

Development of the fourth generation mobile communications method that is a mobile communications method of the next generation of IMT-2000 (International Mobile Telecommunication 2000) is progressing. The fourth generation mobile communications method is desired to flexibly support versatile cell environments, i.e., from multi-cell environments including cellular systems to isolated cell environments, such as hot spot areas and indoors, while enhancing frequency use efficiency in both types of cell environments.

As a candidate for the radio access method to be applied to a link from a mobile station to a base station (an uplink) in the fourth generation mobile communications method, direct spread spectrum code division multiple access (DS-CDMA: Direct Sequence-Code Division Multiple Access) is leading from the viewpoint that it is especially suited for cellular systems. According to DS-CDMA, symbol sequences to be transmitted are multiplied by a spreading code such that a spread spectrum signal is obtained, which spread spectrum signal is transmitted through a wide frequency bandwidth (for example, Non-Patent Reference 1).

Reasons why the DS-CDMA is suitable for the multi-cell environment including cellular systems are as follows. First, as compared with radio access methods using a great number of subcarriers such as OFDM (orthogonal frequency division multiplexing) and MC-CDMA (Multi-Carrier Code Division Multiple Access), the ratio of peak power to mean power can be made small. Accordingly, the power requirement of the mobile station is small, which is an important property of the DS-CDMA.

Second, while reduction of the transmitted power required by a synchronous-detection recovery using an individual pilot channel is effective in the uplink, the pilot channel power of DS-CDMA per carrier is greater than that of OFDM, MC-CDMA, etc., for the same level of pilot channel power. Therefore, highly precise channel estimation is obtained, and the transmission power can be made small.

Third, in the multi-cell environment, DS-CDMA can use the same carrier frequency in an adjacent cell, since interference from the adjacent cell ("adjacent cell interference") can be reduced by the spread spectrum gain obtained by spreading the spectrum of the signal. For this reason, a repetition of "1 cell frequency" is easily realized, i.e., all the available bandwidth is repeatedly assigned to each cell. Accordingly, frequency use efficiency of DS-CDMA is high as compared with TDMA (Time Division Multiple Access) wherein the "adjacent cell interference" is avoided by splitting the available frequency bandwidth, each cell being assigned only a split segment of the frequency bandwidth differentiated from cell to cell.

However, since DS-CDMA is a radio access method suitable for multi-cell environments, problems are anticipated as follows. That is, the advantage of DS-CDMA in that the influence of the "adjacent cell interference" is reduced by spread spectrum is not an advantage in isolated cell environments, such as small hot spot areas and indoors where "adjacent cell interference" is not a concern. For this reason, in order to realize the same level of efficient frequency use by DS-CDMA as TDMA, it is necessary to accommodate a great number of signals.

For example, where each mobile station transmits by multiplying a spread spectrum code of the spreading factor SF by a signal to be transmitted, information transmission speed is 1/SF. Here, in order to realize the same frequency use efficiency as TDMA, the number of signals that DS-CDMA needs to accommodate is equal to SF. However, in the radio propagation environment of an actual uplink, multiple-access interference (MAI: Multiple Access Interference) becomes dominant. MAI is interference to a signal of a mobile station by another mobile station, MAI being originated by a difference of propagation conditions among mobile stations to a base station, for example, change in a propagation delay time and a propagation path. Consequently, the frequency use efficiency normalized by the spreading factor is reduced to about 20% to 30%.

In order to reduce the MAI, a radio access method called IFDMA (Interleaved Frequency Division Multiple Access) is being studied (for example, Non-patent Reference 2). According to IFDMA, information symbols are rearranged by applying symbol repetition so that a certain symbol pattern is generated, a unique phase of a mobile station is multiplied by the symbol pattern, and the multiplied signal is transmitted. In this manner, signals from mobile stations are arranged not to overlap each other in the frequency domain, and MAI is reduced.

Another approach for reducing MAI is being studied, wherein transmission timing is controlled so that the frequency use efficiency is raised (for example, Non-patent Reference 3). FIG. 31 is a timing chart showing timing of signals being received according to the conventional technology with and without transmission timing control being applied. As shown in FIG. 31, when timing control is not applied, signals transmitted by mobile stations 210 through 230 arrive at a base station 110 with different receiving timings due to different propagation delay times to the base station 110. Then, the transmission timings of the mobile stations 210 through 230 are controlled such that the signals transmitted by the mobile stations 210 through 230 arrive at the base station 110 with the same timing as shown in FIG. 31. If an orthogonal code is used as the spreading code at this time, received signals from the different mobile stations at the timing are orthogonal to each other, and the multiple access interference (MAI) is reduced. In this manner, the frequency use efficiency is raised.

Further, another approach of suppressing the multi-path interference is being studied, wherein a receiving unit carries out signal processing to a received signal influenced by multi-path interference. Typical examples using this approach are a multi-path interference canceller (for example, Non-patent Reference 4) as shown by FIG. 32, a chip equalizer (for example, Non-patent Reference 5) as shown by FIG. 33, and a frequency domain equalizer (for example, Non-patent Reference 6) as shown by FIG. 34.

According to the multi-path interference canceller shown in FIG. 32, a signal component causing the multi-path interference is estimated and generated (multi-path interference replica) by a multi-path interference signal estimating unit 351, and the multi-path interference replica is subtracted from a received signal by a multi-path interference signal removing unit 352. Thereby, the influence of multi-path interference of the received signal is reduced.

According to the chip equalizer shown in FIG. 33, a channel matrix that expresses the amount of change that the signal receives through the propagation path is generated by a channel matrix generating unit 361, a weighting factor that reduces the multi-path interference is deducted from the matrix by a weighting factor estimating unit 362, and the weighting factor and the received signal are multiplied by a chip equalizing unit 363 (this operation is called chip equalization). Thereby, the influence of the multi-path interference is reduced.

According to the frequency domain equalizer shown in FIG. 34, the received signal is converted to a signal in the frequency domain by a time-frequency conversion unit 371, a weighting factor that reduces the multi-path interference is generated by a weighting-factor estimating unit 372, the weighting factor and the received signal in the frequency domain are multiplied by a frequency domain equalizing unit 373, and a frequency-time conversion unit 374 converts the signal to a signal in the time domain. In this manner, the influence of the multi-path interference is reduced.

[Non-Patent Reference 1]
H. Atarashi, S. Abeta, and M. Sawahashi,
"Broadband packet wireless access appropriate for high-speed and high-capacity throughput," IEEE VTC2001-Spring, pp. 566-570, May 2001.

[Non-Patent Reference 2]
M. Schnell, I. Broek, and U. Sorger,
"A promising new wideband multiple-access scheme for future mobile communication systems", European Trans, on Telecommun (ETT), vol. 10, no. 4, pp. 417-427, July/August 1999.

[Non-Patent Reference 3]
Een-Kee Hong, Seung-Hoon Hwang and Keum-Chan Whang,
"Synchronous transmission technique for the reverse link in DS-CDMA terrestrial mobile systems", pp. 1632-1635, vol. 46, no. 11, IEEE Trans. on Commun., November, 1999.

[Non-Patent Reference 4]
Kenichi Higuchi, Akihiro Fujiwara and Mamoru Sawahashi,
"Multipath-Interference-Canceller-for-High-Speed Packet Transmission-With-Adaptive-Modulation-and-Coding-Scheme-in W-CDMA Forward Link", IEEE Selected Area-Communications, Vol. 20, No. 2, February 2002.

[Non-Patent Reference 5]
A. Klein,
"Data detection algorithms specially designed for the downlink of CDMA mobile radio systems", in Proc. IEEE VTC'97, pp. 203-207, May 1997.

[Non-Patent Reference 6]
D. Falconer, SL Ariyavisitakul, A. Benyamin-Seeyar and B. Eidson,
"Frequency domain equalization for single-carrier broadband wireless systems", IEEE Commun. Mag., vol. 40, no. 4, pp. 58-66, April 2002.

PROBLEM(S) TO BE SOLVED BY THE INVENTION

However, there are the following problems in the conventional technologies described above.

Since there is no spread spectrum gain in IFDMA, it is necessary to split the bandwidth into two or more frequency sub-bands in a multi-cell environment, and to assign split frequency bands to cells, which is the same as TDMA. Therefore, even if IFDMA is used, the frequency use efficiency cannot be raised in all the cell environments, i.e., the multi-cell environment and the isolated cell environment. Raising the frequency use efficiency increases the number of mobile stations that can be accommodated in a base station of each cell, and realizes a large capacity link.

Further, the conventional technologies are related to individual components of radio communications systems. When actually building a radio communications system, the overall structure and specific configurations of the base stations and mobile stations have to be considered. Further, a specific control method of the individual component is required. However, in the present condition, the problem is in that the overall structure, the specific configurations, and the specific control method have not been satisfactorily studied.

SUMMARY OF THE INVENTION

It is a general object of the present invention to provide a base station, a mobile station, a radio communications system, and a radio transmission method using spread spectrum and chip repetition that substantially obviate one or more of the problems caused by the limitations and disadvantages of the related art.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a base station, a mobile station, a radio communications system, and a radio transmission method using spread spectrum and chip repetition particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides as follows.

MEANS FOR SOLVING THE PROBLEM

In order to solve the object, the base station of the present invention that is capable of radio communications with the mobile station includes a control information determining unit that determines control information and transmits the control information to the mobile station, the control information containing a spreading factor, information indicating how many times the chip is to be repeated (the number of chip repetitions), and a phase unique to the mobile station (unique phase). The spreading factor, the number of chip repetitions, and the unique phase of the mobile station are determined based on at least one of information that indicates the structure of a cell in which the mobile station is present, information that indicates the number of mobile stations that are present in the cell, information rate required by the mobile station, information that indicates the type of traffic, information about a radio parameter of the mobile station, information that indicates propagation path conditions, and information that indicates interference from an adjacent cell.

Further, the base station may include an information acquisition unit to collect at least one of the following items from a reservation packet transmitted by the mobile station, namely, information that indicates the number of mobile stations that are present in the cell, information that indicates an information rate required by the mobile station, information that indicates the type of traffic, and information about the radio parameter of the mobile station, and a propagation path condition measurement unit to measure the propagation path conditions and the interference from an adjacent cell.

Further, the control information determining unit may be configured such that it determines the spreading factor, and the number of chip repetitions at least one of at least every one cell at least every sector, and every multi-beam.

Further, the control information determining unit may be configured such that it determines at least one phase to be assigned to the mobile station based on the information that indicates the interference from the adjacent cell.

Further, the base station may include a mobile station information reporting unit that is configured to provide information about mobile stations that are present in the cell to a base station of an adjacent cell, wherein the control information determining unit is configured to determine at least one phase to be assigned to the mobile station in the cell based on the information about mobile stations of the adjacent cell.

Further, the control information determining unit may be configured such that a guard interval length is determined based on at least one of the cell structure, a cell radius, a magnitude of multi-path delay, the number of mobile stations in the cell, and a magnitude of a chip pattern that is generated by repeating the chip for a given number of times.

Further, the mobile station of the present invention, which transmits a spread spectrum signal generated by multiplying a signal and the spreading code to a base station by DS-CDMA, includes a spreading code generating unit to generate a spreading code based on the spreading factor provided by the base station, a chip repetition unit to repeat a chip sequence after spectrum spread for the number of times, the number being provided by the base station, and a phase sequence generating unit to generate at least one phase that is to be multiplied by an output signal of the chip repetition unit, the phase being unique to the mobile station, based on a control signal from the base station.

Further, the mobile station may include a guard interval inserting unit that inserts a guard interval for every chip pattern that is generated by repeating the chip sequence the number of times, the number being based on the control signal from the base station.

The radio communications system of the present invention includes the mobile station, and the base station that is capable of radio communication with the mobile station. Further, the base station includes a control information determining unit to determine the spreading factor, the number of chip repetitions that the mobile station uses, and the phase unique to the mobile station based on at least one of the information about the structure of the cell, the information about the number of the mobile stations that are present in the cell, the information about required information rate of the mobile station, the information about the type of traffic, the information about the radio parameter of the mobile station, the information about the propagation path condition, and the information about the interference from the adjacent cell; and transmits the determined spreading factor, the number of chip repetitions, and the phase unique to the mobile station as control information to the mobile station. Further, the mobile station includes a spreading code generating unit to generate a spreading code based on the spreading factor provided by the base station, a chip repetition unit to repeat the chip sequence after spectrum spreading the number of times provided by the base station, and a phase sequence generating unit to generate at least one unique phase of the mobile station based on the control signal from the base station, the phase being multiplied by the output signal of the chip repetition unit.

Further, the radio transmission method according to the present invention applies to a radio communications system that includes a mobile station, and a base station that can communicate with the mobile station. The radio transmission method includes a step to determine the spreading factor, the number of chip repetitions, and the phase unique to the mobile station that the mobile station is to use based on at least one of the information about the structure of the cell, the information about the number of the mobile stations that are present in the cell, the information about required information rate of the mobile station, the information about the type of traffic, the information about the radio parameter of the mobile station, the information about the propagation path condition, and the information about the interference from the adjacent cell, a step to transmit the determined spreading factor, the number of chip repetitions, and the phase unique to the mobile station as control information to the mobile station, a step to generate a spreading code based on the spreading factor provided by the base station, a step to repeat the chip sequence after spectrum spreading the number of times provided by the base station, and a step to generate a unique phase of the mobile station, the phase being multiplied by the chip sequence after spectrum spreading the number of times provided by the control signal from the base station.

EFFECT OF THE INVENTION

According to embodiments of the present invention, the base station, the mobile station, the radio communications system, and the radio transmission method that can improve the frequency use efficiency in multi-cell environments are realized.

BRIEF DESCRIPTION OF THE DRAWINGS

FIG. 3 is a flowchart for explaining operations of the radio communications system according to the embodiment of the present invention;

FIG. 4A is a map for explaining operations of the base station of the radio communications system according to the embodiment of the present invention, and is for explaining application of a chip repetition factor;

FIG. 4B is a flowchart showing operational steps when applying the chip repetition factor based on the cell structure;

FIG. 4C is a flowchart that shows operational steps when applying the chip repetition factor based on power of "adjacent cell interference";

FIG. 9A is a table for explaining the operations of the base station of the radio communications system according to the embodiment of the present invention, wherein the number of chip repetitions is explained;

FIG. 9B is a table for explaining the operations of the base station of the radio communications system according to the embodiment of the present invention, wherein the number of chip repetitions is explained;

FIG. 9C is a flowchart that shows the operations of assigning the number of chip repetitions;

FIG. 15A is a table for explaining the operations of the base station of the radio communications system according to the embodiment of the present invention, wherein the spreading factor is explained;

FIG. 15B is a flowchart that shows the operations when determining the spreading factor;

FIG. 16A is a table that shows the operations of the base station of the radio communications system according to the embodiment of the present invention, wherein the spreading factor is explained;

FIG. 16B is a flowchart that shows the operations when determining the spreading factor;

FIG. 17A is a table for explaining the operations of the base station of the radio communications system according to the embodiment of the present invention, wherein the spreading factor, a modulation technique, and a rate of encoding are explained;

FIG. 17B is a table for explaining the operations of the base station of the radio communications system according to the embodiment of the present invention, wherein the spreading factor, a modulation technique, and a rate of encoding are explained;

FIG. 18 is a schematic diagram for explaining the operations of the radio communications system according to the embodiment of the present invention;

FIG. 21B is a schematic diagram for explaining control of the phase sequence;

FIG. 23 gives frequency diagrams for explaining the operations of the radio communications system according to the embodiment of the present invention;

FIG. 24 is a frequency diagrams for explaining the operations of the radio communications system according to the embodiment of the present invention;

FIG. 25 is a frequency diagrams for explaining the operations of the radio communications system according to the embodiment of the present invention;

FIG. 27A is an explanatory chart for explaining the operations of the base station of the radio communications system according to the embodiment of the present invention, wherein control of guard interval length is shown;

FIG. 27B is a flowchart for explaining the operations when controlling the guard interval length;

FIG. 33 is a block diagram showing the structure of an example of conventional chip equalizer; and FIG. 34 is a block diagram showing the structure of an example of conventional frequency domain equalizer.

DESCRIPTION OF THE PREFERRED EMBODIMENTS

In the following, embodiments of the present invention are described with reference to the accompanying drawings.

In the accompany drawings, where items have the same function, the same reference mark is assigned, and explanations thereof are not repeated.

Figure 1:
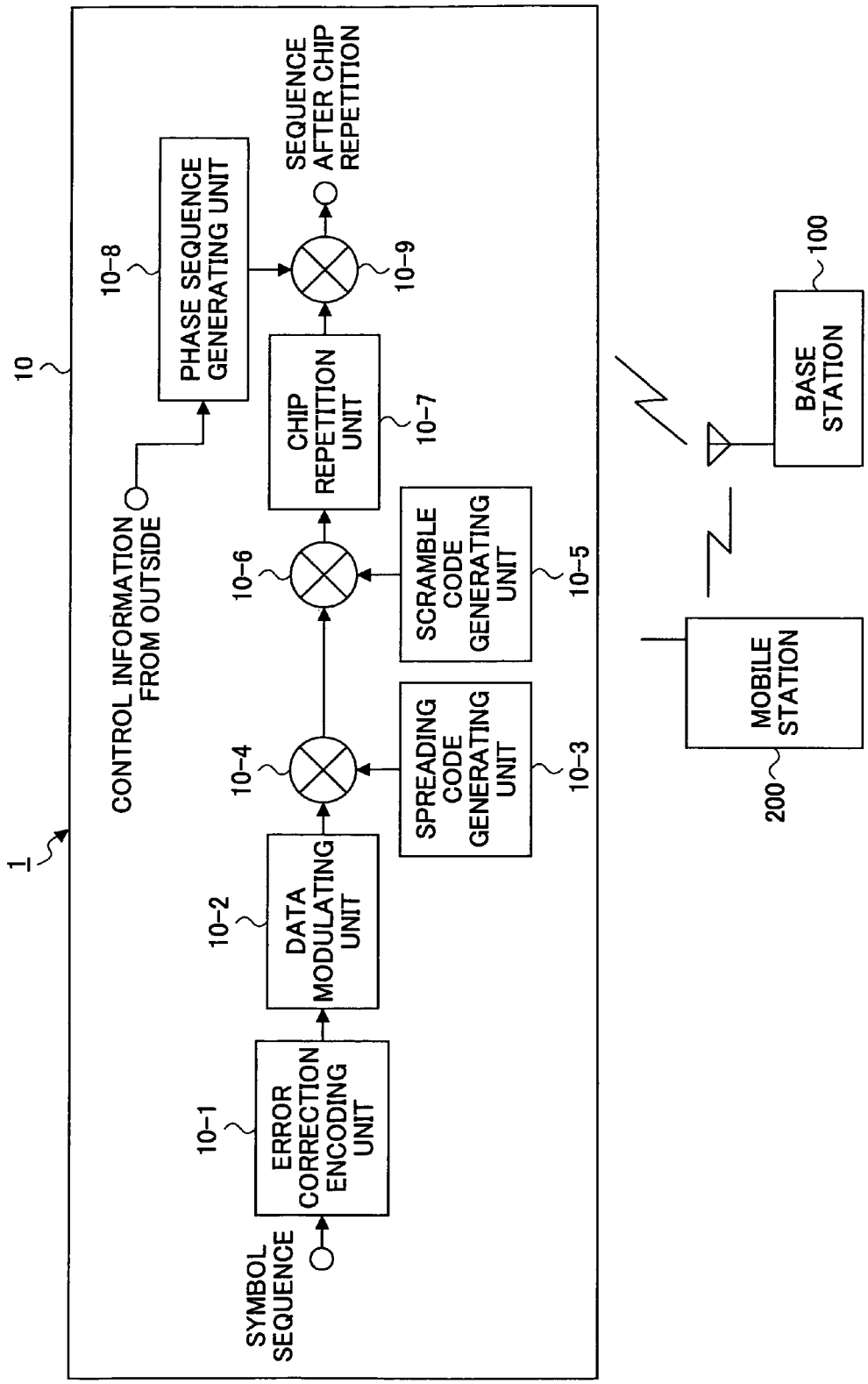
FIG. 1 is a block diagram for explaining the structure of a radio communications system according to the embodiment of the present invention.

First, the structure of a radio communications system 1 according to the embodiment of the present invention is described with reference to FIG. 1.

The radio communications system 1 improves the system throughput by adaptively changing and controlling the spreading factor and the number of chip repetitions (chip repetition factor; CRF) according to versatile environments, for example, a multi-cell environment, an isolated cell environment, a hot spot area, inside a building, etc., by using VSCRF-CDMA (Variable Spreading and Chip Repetition Factor-CDMA), and using the same radio interface.

The radio communications system 1 according to the embodiment includes a mobile station 10 and the base station 100. The mobile station 10 transmits a radio signal to the base station 100, the radio signal being diffused (spectrum spread) by multiplying a spreading code by a symbol sequence. The mobile station 10 includes an error correction encoding unit 10-1, a data modulating unit 10-2 connected to the error correction encoding unit 10-1, a multiplier 10-4 connected to the data modulating unit 10-2, a spreading code generating unit 10-3 and a multiplier 10-6 connected to the multiplier 10-4, a scramble code generating unit 10-5 and a chip repetition unit 10-7 connected to the multiplier 10-6, a multiplier 10-9 connected to the chip repetition unit 10-7, and a phase sequence generating unit 10-8 connected to the multiplier 10-9.

A symbol sequence, for example, a binary code sequence, is provided to the error correction encoding unit 10-1. The error correction encoding unit 10-1 applies an error correcting code, such as, for example, a turbo code and a convolutional code to the provided symbol sequence such that channel encoding is carried out, and the channel encoded symbol sequence is provided to the data modulating unit 10-2. The data modulating unit 10-2 modulates the channel encoded symbol sequence, and the modulated signal is provided to the multiplier 10-4. Based on the spreading factor provided by the base station 100, the spreading code generating unit 10-3 generates a spreading code, and provides the spreading code to the multiplier 10-4.

The multiplier 10-4 multiplies the spreading code to the modulated signal, and provides the multiplied signal by the multiplier 10-6. The multiplier 10-6 multiplies the provided signal by a scramble code generated by the scramble code generating unit 10-5 such that a chip sequence that is spectrum spread is generated, and the spectrum spread chip sequence is provided to the chip repetition unit 10-7.

The chip repetition unit 10-7 generates a chip pattern by repeating the spectrum spread chip sequence for a predetermined number of times, and provides the chip pattern to the multiplier 10-9. The multiplier 10-9 multiplies the provided chip pattern and a phase sequence unique to the mobile station generated by the phase sequence generating unit 10-8 such that a sequence after chip repetition is generated.

Figures 2A, 2B:
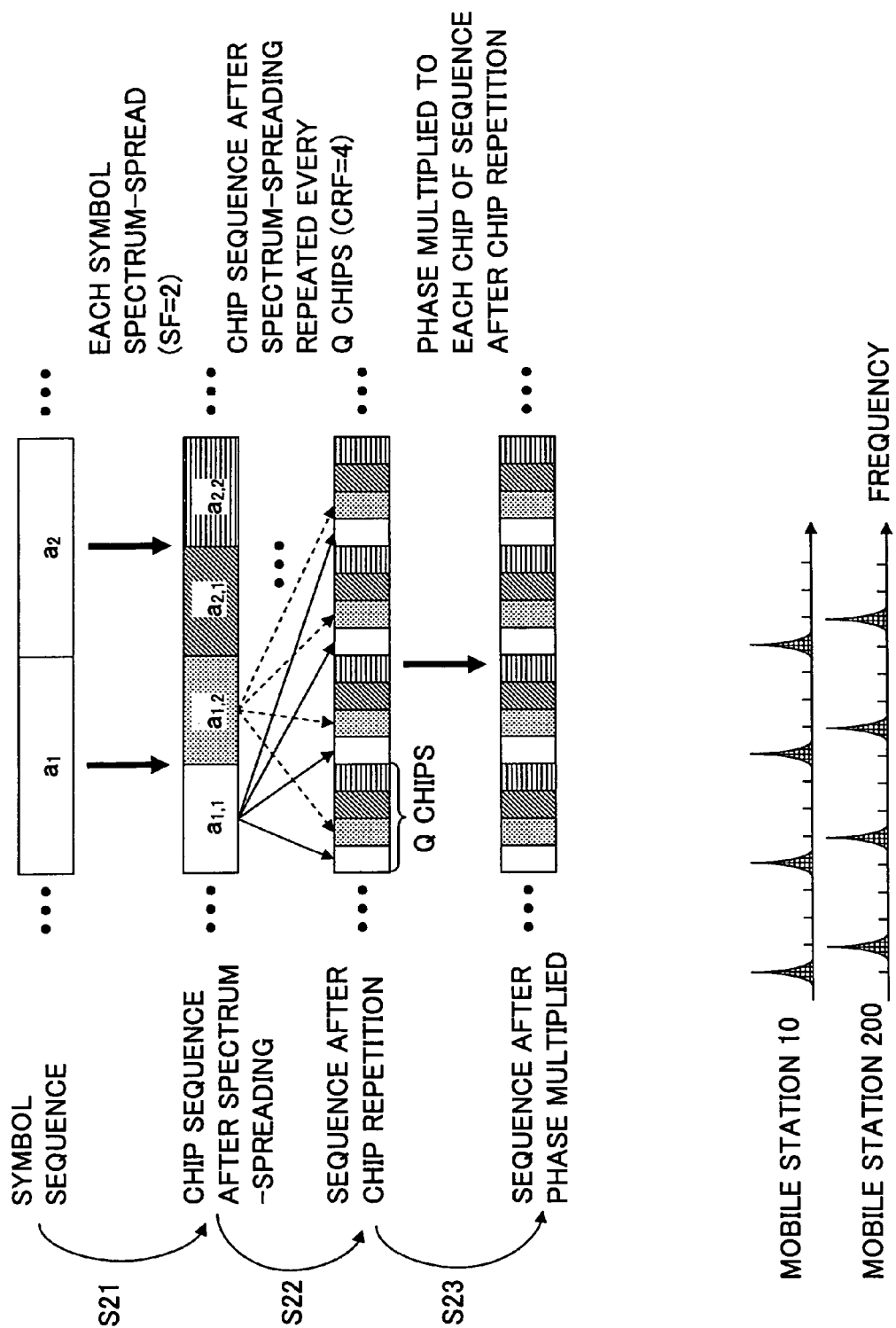
FIG. 2A is a schematic drawing showing main operations of the mobile station of the radio communications system according to the embodiment of the present invention, and is for explaining a generation process of sequences after phase sequence multiplication.
FIG. 2B is a frequency spectrum chart for explaining an example of frequency spectrum of a signal that the mobile station transmits.

Next, operations of the mobile station 10 according to the present invention are described with reference to FIG. 2A and FIG. 2B. First, FIG. 2A is referred to. Symbol sequences a1, a2, and so on are modulated signals to be transmitted, by which the spreading code, the spreading factor (SF) of which is assumed to be 2, for example, generated by the spreading code generating unit 10-3 is multiplied by the multiplier 10-4. Then, the scramble code generated by the scramble code generating unit 10-5 is multiplied by the multiplier 10-6 such that a chip sequence after spread spectrum consisting of "a1, 1", "a1, 2", "a2, 1", "a2, 2", and so on is generated (Step S21).

Subsequently, the chip repetition unit 10-7 repeats the chip sequence after spread spectrum for the predetermined number of times, the number being the number of chip repetitions, which is assumed to be 4 (CRF=4) in this example (Step S22) such that a signal after chip repetition, called a chip pattern, is generated. By doing (Step S22), the chip rate at the sequence after chip repetition is CRF times higher than the chip sequence after spectrum-spreading (CRF is the number of chip repetition times).

Next, the unique phase of the mobile station is multiplied by the chip pattern (Step S23). The chip sequence, by which the unique phase of the mobile station is multiplied, has a frequency spectrum as shown by FIG. 2B. Since the chip sequence is a signal that has a fixed chip pattern, the frequency spectrum looks like the shape of teeth forming a comb, called comb-teeth hereinbelow.

Further, when the multiplier 10-9 multiplies the unique phase of the mobile station 10 generated by the phase sequence generating unit 10-8 by the signal that has the fixed chip pattern, positions where the comb-teeth are present are shifted. In this manner, the frequency spectrum of the mobile station 10 and a frequency spectrum of another mobile station 200 (refer to FIG. 1) do not overlap.

Figure 30:
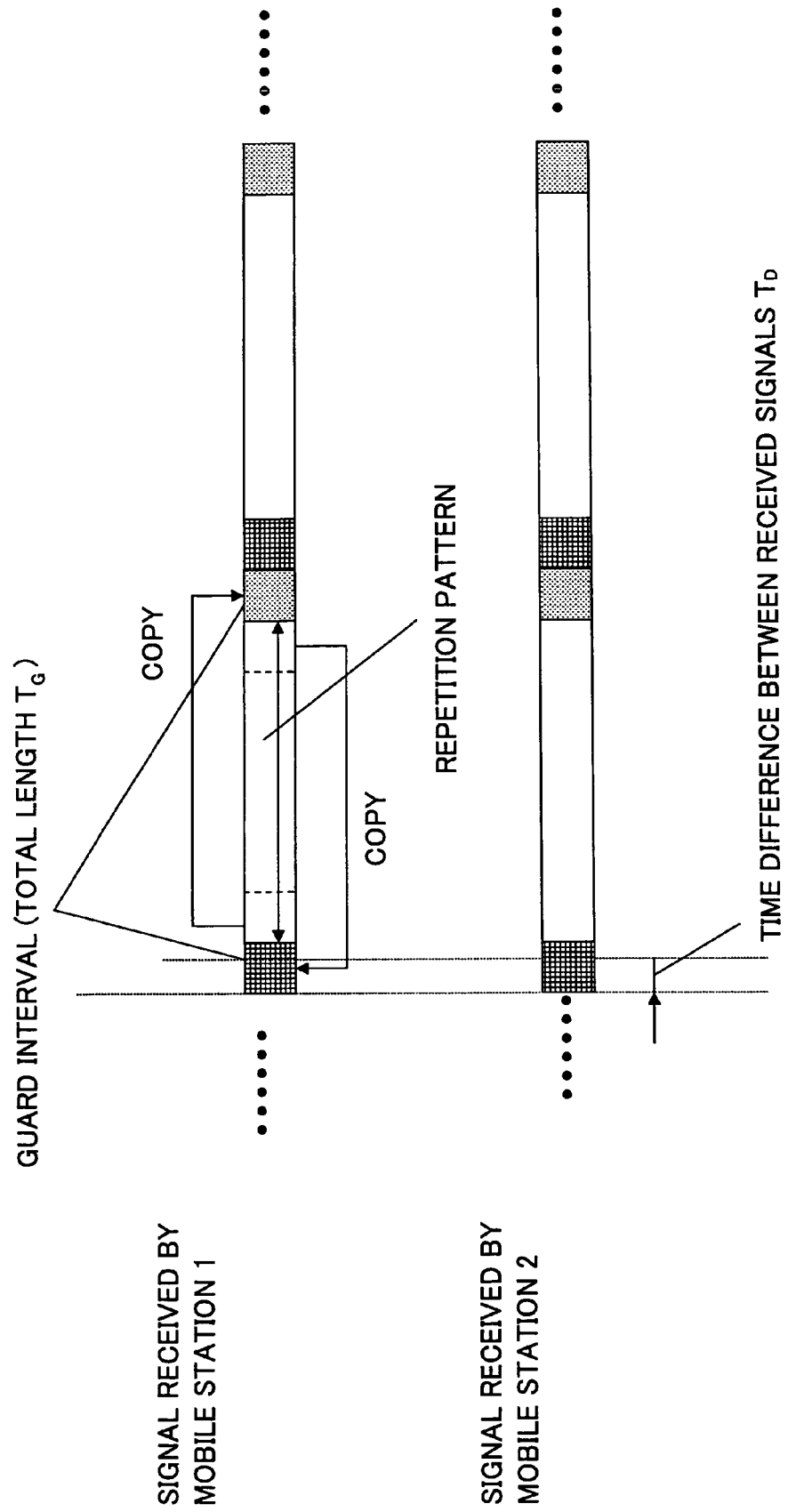
FIG. 30 is a time chart for explaining the operations of the base station of the radio communications system according to the embodiment of the present invention.
Figure 31:
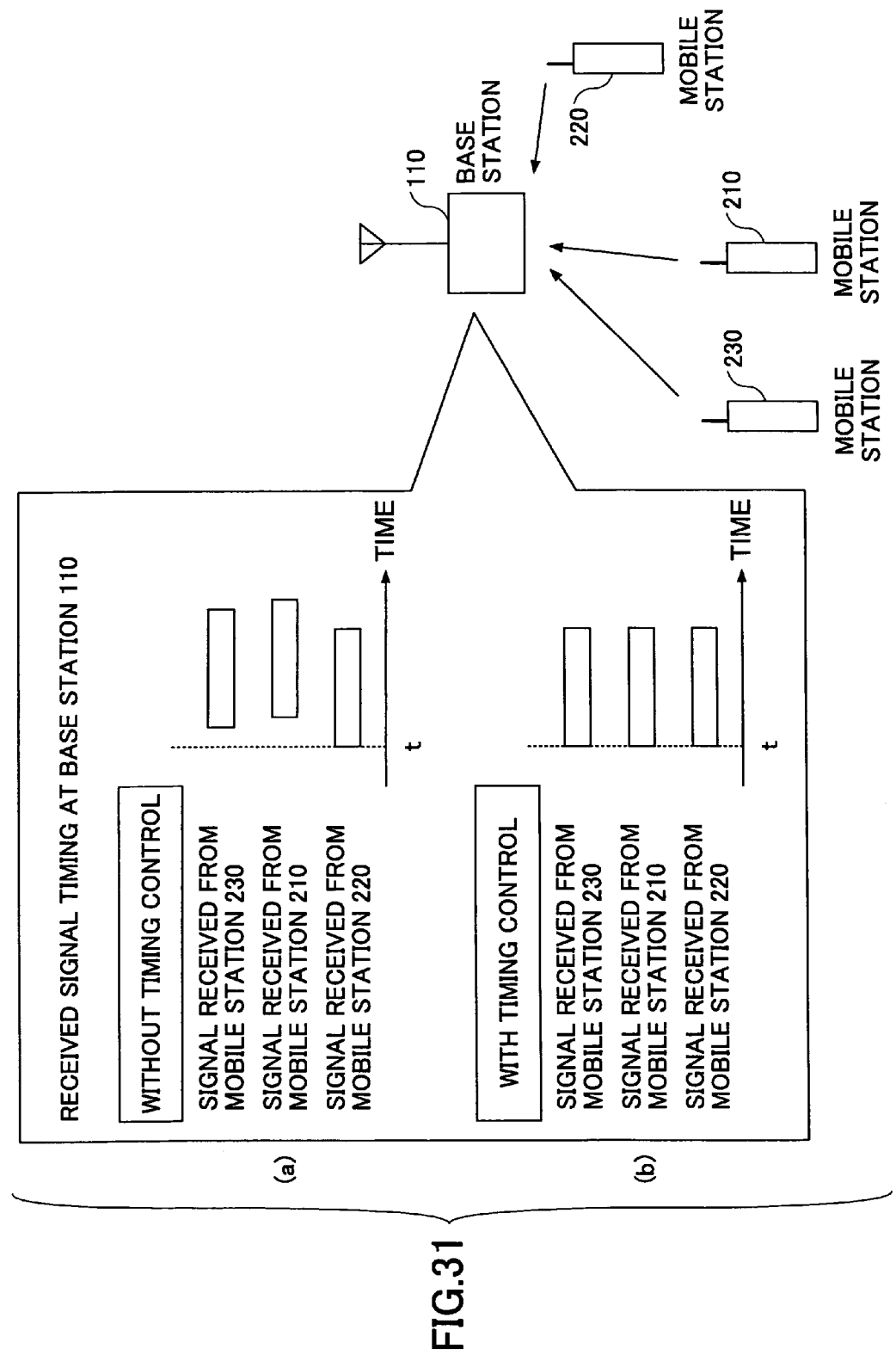
FIG. 31 is a time chart showing the cases of the conventional technology, where the case of transmission timing control not being applied to an uplink, and the case of transmission timing control being applied to the uplink are shown.
Figure 32:
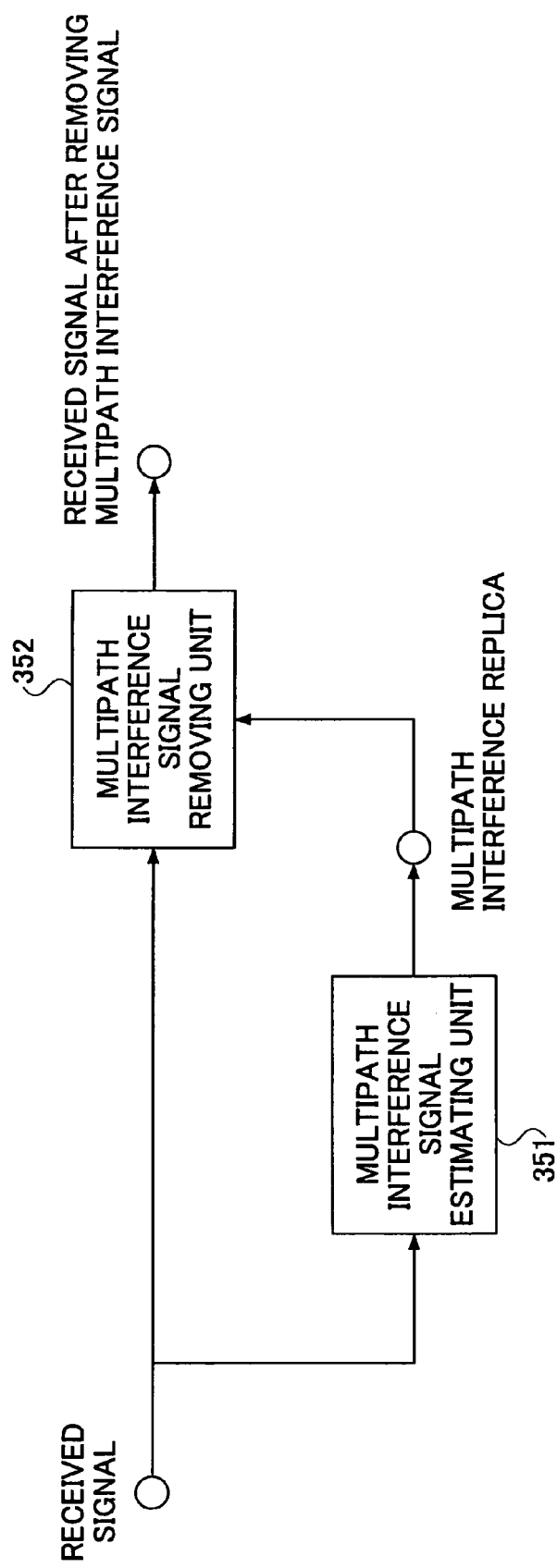
FIG. 32 is a block diagram showing the structure of an example of conventional multi-path interference canceller.

Accordingly, even if two or more mobile stations 10 and 200 simultaneously communicate with the same base station 100, frequency spectra of the mobile stations perpendicularly intersect in the frequency domain, and interference to each other's signals is reduced. At this time, if the receiving timing at the base station 100 of the signals transmitted from the mobile stations 10 and 200 is the same, the frequency spectra of the mobile stations 10 and 200 perfectly perpendicularly intersect in the frequency domain. In Uplink communication, the receiving timings at the base station 100 of the signals transmitted from the different mobile station are different from each other as shown by FIG. 31. Therefore loose transmission timing control is applied to align the receiving timings of the different mobile station as possible. Furthermore, by inserting guard interval as shown by FIG. 30 additional to the loose transmission timing control, the frequency spectra of the different mobile station are perfectly maintained orthogonal in the frequency domain.

As described above, according to the radio communications system 1 of the embodiment of the present invention, the mobile station 10 can generate a transmission signal that has a frequency spectrum that perpendicularly intersects in the frequency domain a frequency spectrum of other mobile stations (for example, mobile station 200) by performing the chip repetition and the phase multiplication. Therefore, in the uplink where two or more mobile stations are simultaneously connected to the base station 100, interference is reduced, and the link capacity is increased.

Next, the base station 100 according to the embodiment of the present invention is described.

The base station 100 includes a spreading factor and number of chip repetitions determining unit, a phase determining unit that determines a unique phase of a mobile station, and a reporting unit that is connected to the spreading factor and number of chip repetitions determining unit, and the phase determining unit, configured to provide the determined spreading factor, the number of chip repetitions, and the phase to the mobile stations 10 and 200, wherein the spreading factor and number of chip repetitions determining unit determines the spreading factor and the number of chip repetitions of a physical channel of each mobile station as shown in FIG. 3 based on at least one of information that indicates the type of cell environments (the structure of the cell), in which the mobile stations 10 and 200 are present, information that indicates the number of mobile stations that are present in the cell, information that indicates required information rates of the mobile stations and types of traffic, information that indicates radio parameters of the mobile stations, information that indicates propagation path conditions, and information that indicates interference from the adjacent cells.

Next, operations of the radio communications system 1 according to the embodiment are described with reference to FIG. 3.

First, the base station 100 acquires at least one of information that indicates the structure of the cell in which the mobile stations 10 and 200 are present, information that indicates the number of mobile stations that are present in the cell, information that indicates required information rates of the mobile stations and types of traffic, information that indicates radio parameters of the mobile stations, information that indicates propagation path condition, and information that indicates interference from the adjacent cells, and then determines the number of chip repetitions, the spreading factor, and the unique phase of the mobile station (Step S301). Next, the base station 100 provides the determined number of chip repetitions, the spreading factor, and the unique phase of the mobile station to the mobile station 10 (Step S302).

The mobile station 10, which receives the number of chip repetitions, the spreading factor, and the unique phase of the mobile station from the base station 100, decodes the values of the number of chip repetitions, the spreading factor, and the unique phase of the mobile station provided by the base station 100 (Step S303), and generates a transmission signal based on the number of chip repetitions, the spreading factor, and the unique phase of the mobile station that are decoded (Step S304). Then, the mobile station 10 transmits the generated signal to the base station 100 (Step S305). The base station 100 receives the signal transmitted from the mobile station 10 (Step S306).

According to the radio communications system of the embodiment, the base station 100 determines at least one of the spreading factor, the number of chip repetitions, and the unique phase of the mobile station based on interference from an adjacent cell that uses the same frequency in view of application to the multi-cell environment.

Specific examples of the information that the base station 100 acquires are as follows.

The information about cell structure: whether the cell is of a cellular system, a hot spot or inside a building environment.

The information about the number of the mobile stations in the cell: multiple-access interference.

The information about the traffic types: whether the traffic is RT (Real Time) or NRT (Non-Real Time).

The information about the radio parameter: modulation technique such as QPSK (Quadrature Phase Shift Keying) and 16QAM (Quadrature Amplitude Modulation), and the rate of channel encoding.

The information about the propagation path condition: the number of multi-paths, a delay spread, and a Doppler frequency of each mobile station.

In order to collect the information such as described above, the base station 100 includes a propagation path condition measurement unit that measures the propagation path condition and the interference from the adjacent cell, and an information acquisition unit that acquires from a reservation packet at least one of the information that indicates the number of the mobile stations that are present in the cell, the information that indicates the required information rate and the type of traffic of the mobile station, and the information that indicates the radio parameter of the mobile station.

Next, an application method of the spreading factor and the number of chip repetitions is described.

The chip repetition factor may be applied depending on the cell structure. In an example shown in FIG. 4A, the spreading factor and number of chip repetitions determining unit controls such that the chip repetition factor is applied to an isolated cell environment where the interference from other cells is small, and is not applied to a multi-cell environment (i.e., the number of chip repetitions is set to 1).

First, the operations when controlling the chip repetition factor based on the cell structure are described with reference to FIG. 4B.

First, the base station 100 recognizes the cell structure (Step S411). Next, whether the recognized cell structure is an isolated cell, a hot spot, indoor, etc., is determined (Step S412). If the cell structure is determined to be an isolated cell, a hot spot, indoor, etc., (Step S412: Yes), the chip repetition is applied (Step S414). Otherwise, if the cell structure is determined not to be an isolated cell, a hot spot, indoor, etc., (Step S412: No), the chip repetition is not applied (Step S413).

Next, the case where the chip repetition factor is controlled based on "adjacent cell interference" power is described with reference to FIG. 4C.

First, the base station 100 measures "adjacent cell interference" power (Step S421). Then, whether the measured "adjacent cell interference" power is smaller than a predetermined threshold is determined (Step S422). If it is determined that the "adjacent cell interference" power is smaller than the predetermined threshold (Step S422: Yes), the chip repetition is applied (Step S424). Otherwise, if the "adjacent cell interference" power is determined to be no smaller than the predetermined threshold (Step S422: No), the chip repetition is not applied (Step S423).

Next, control of the spreading factor generated by the spreading code generating unit 10-3 of the mobile station 10, and a range (unit) of control of the number of chip repetitions generated by the chip repetition unit 10-7 are described with reference to FIGS. 5A, 5B, 5C, 6A and 6B.

The control of the number of chip repetitions and the spreading factor in the multi-cell environment may be carried out in various ways such as shown in FIGS. 5A, 5B, 5C, 6A and 6B.

Figure 5C:
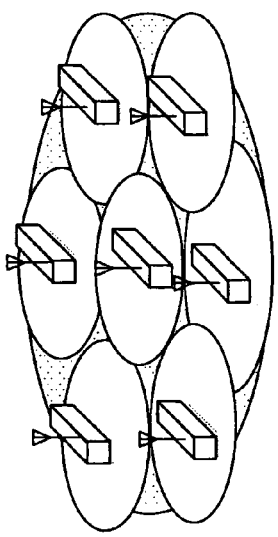
FIG. 5C is for explaining the case where control is carried out with one base station serving as the unit.
Figure 5B:
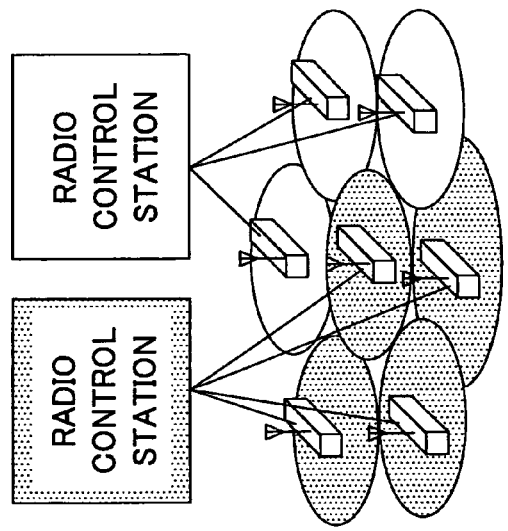
FIG. 5B is for explaining the case where control is carried out in units of two or more base stations.
Figure 5A:
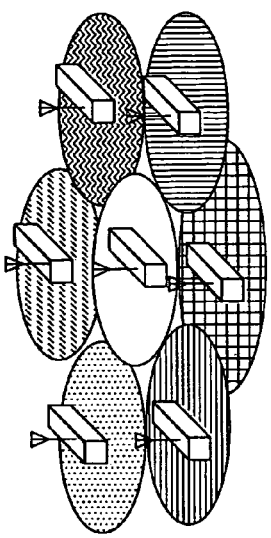
FIG. 5A is a map for explaining the operations of the radio communications system according to the embodiment of the present invention, wherein the case where the same control is performed in a cellular system is shown.

FIG. 5A shows the case where the same control is performed to the entirety of a cellular system.

FIG. 5B shows the case where the control is performed in units of groups, each group being constituted by two or more base stations.

FIG. 5C shows the case where the same control is performed in units of base stations, i.e., for each base station.

Figure 6A:
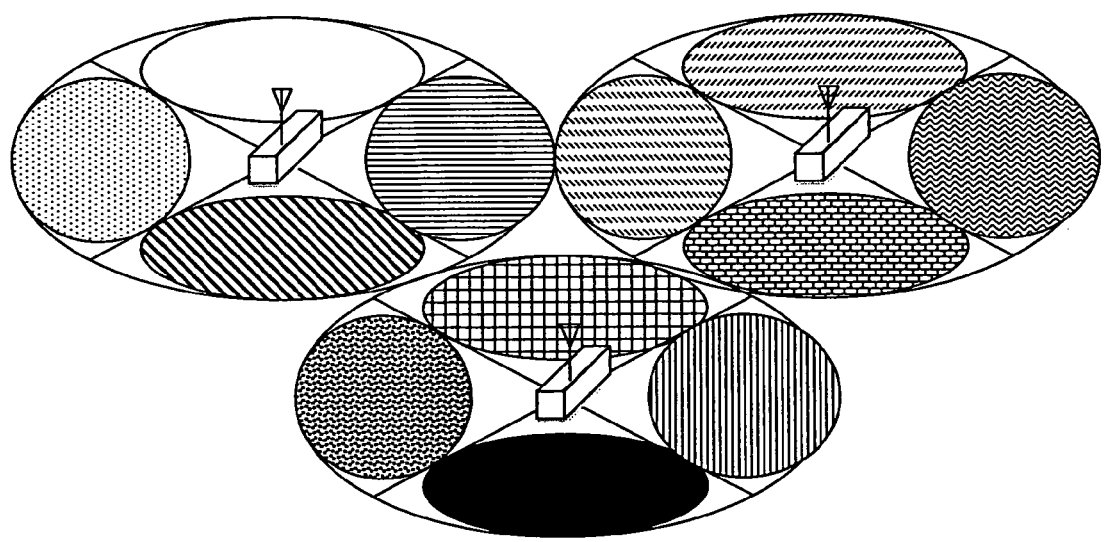
FIG. 6A is a map for explaining operations of the radio communications system according to the embodiment of the present invention, wherein the case of control being performed in units of sectors is shown.

FIG. 6A shows the case where the control is performed in units of sectors, i.e., for each sector.

Figure 6B:
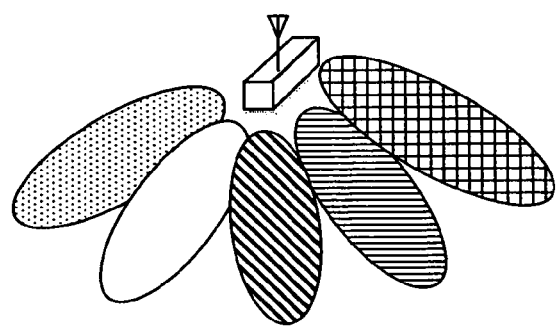
FIG. 6B shows the case of control being performed in units of beams.

FIG. 6B shows the case where the control is performed in units of beams where multi-beams are used, i.e., for each beam. (The multi-beams are directional beams often provided by two or more antennas of the base station.)

While any of the methods described above may be used to control the number of chip repetitions and the spreading factor, performing the same control over the entirety of the cellular system is simple but coarse, and performing the control for each beam provides fine control and increases the system capacity.

For example, when each cell is to independently control the number of chip repetitions, the cell may control the number of chip repetitions for every physical channel, another cell may use a fixed number of chip repetitions, e.g., 4, irrespective of the number of accessing mobile stations, and another cell may control based on the number of accessing mobile stations, for example, the number of chip repetitions is set at 8 if the number of the accessing mobile stations is 8.

Next, a method to determine the spreading factor and the number of chip repetitions is described.

The case where the spreading factor and the number of chip repetitions are determined based on the number of mobile stations in a cell, the number of simultaneously accessing mobile stations and the number of mobile stations requiring a high-speed information rate is described. Here, the difference between the number of mobile stations and the number of simultaneously accessing mobile stations is that the former is the number of mobile stations that are present in the cell including mobile stations that are not communicating, while the latter is the number of mobile stations that are actually communicating. In this case, the number of chip repetitions is increased if there are a great number of mobile stations. In this way, interference of the mobile stations in the cell can be reduced, and a satisfactory quality of communication is attained. If the number of the mobile stations in the cell is small, the value of the spreading factor is increased. In this way, multi-path interference can be reduced, and a satisfactory quality of communication is attained.

Next, the case where the spreading factor and the number of chip repetitions are determined based on the number of simultaneously accessing mobile stations in the cell is described. In this case, the number of chip repetitions is set to a value greater than the number of the simultaneously accessing mobile stations in the cell. In this way, signals of the mobile stations that simultaneously access can be orthogonally arranged in the frequency domain, and interference can be reduced.

Next, the case is described where the spreading factor and the number of chip repetitions are determined based on the number of simultaneously accessing mobile stations requiring a high information rate in the cell. In this case, the number of chip repetitions is set to a value greater than the number of such mobile stations as described above. In this way, the simultaneously accessing mobile stations requiring the high information rate, i.e. great interference power can be orthogonally arranged in the frequency domain, and interference by the mobile stations with the great interference power can be reduced.

Next, the case where the spreading factor and the number of chip repetitions are determined based on the number of multi-paths is described. In this case, the spreading factor is increased when the number of multi-paths is great. Since the influence of multi-path interference becomes remarkable when there are a great number of multi-paths, resistance can be provided against the multi-path interference by increasing the value of the spreading factor. Further, the number of chip repetitions is increased when the number of multi-paths is small. In this manner, priority is given to the orthogonalization in the frequency domain between the mobile stations by chip repetition when there are few multi-paths.

Next, the case where the spreading factor and the number of chip repetitions are determined based on the interference from the adjacent cells is described. In this case, the number of chip repetitions and the value of the spreading factor are increased if the interference from the adjacent cells is great. In this way, the influence of the interference from the adjacent cells can be reduced.

Next, a method to control the chip repetition factor in each physical channel is described with reference to FIGS. 7A, 7B, 8A and 8B.

Figure 7A:
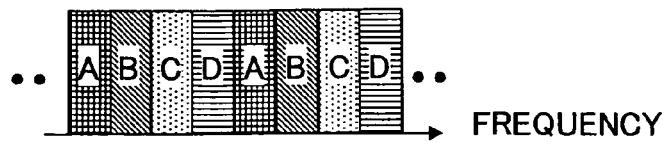
FIG. 7A is for explaining operations of the base station of the radio communications system according to the embodiment of the present invention, wherein a range in which chip repetition factor is controlled is shown.

First, the case where the same control (i.e., the same number of chip repetitions being used) is carried out by two or more accessing mobile stations (by two or more physical channels) is described. When the number of chip repetitions (CRF) is set to 4, for example, as shown by FIG. 7A, allocation of the radio resources in the frequency domain becomes even (same) to all the physical channels of each group. For this reason, distribution of the radio resources in the frequency domain of each physical channel becomes 1/CRF within each group serving two or more physical channels.

Figure 8A:
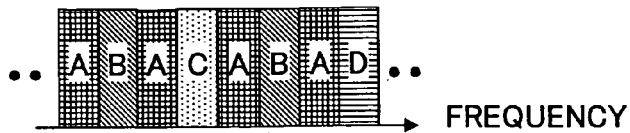
FIG. 8A is for explaining operations of the base station of the radio communications system according to the embodiment of the present invention, wherein a range in which chip repetition factor is controlled is shown.

Next, the case where independent control is performed for each of the physical channels is described. As shown by FIG. 8A, when the number of chip repetitions is 2 for A, 4 for B, 8 for C, and 8 for D, allocation of the radio resources in the frequency domain becomes different between the physical channels. In this way, the radio resources in the frequency domain can be distributed to each physical channel by differentiating the number of chip repetitions.

Figure 7B:
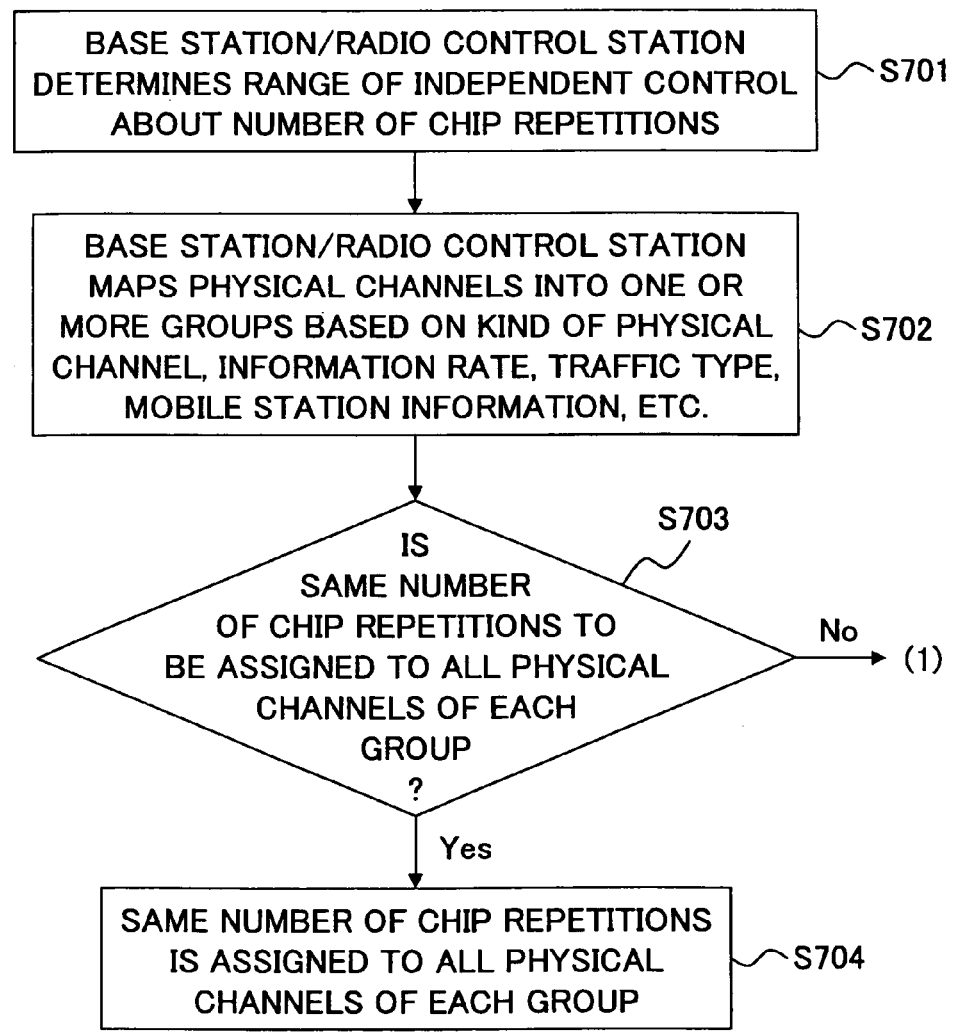
FIG. 7B is a flowchart that shows operations of determining the range in which the chip repetition factor is controlled.
Figure 8B:
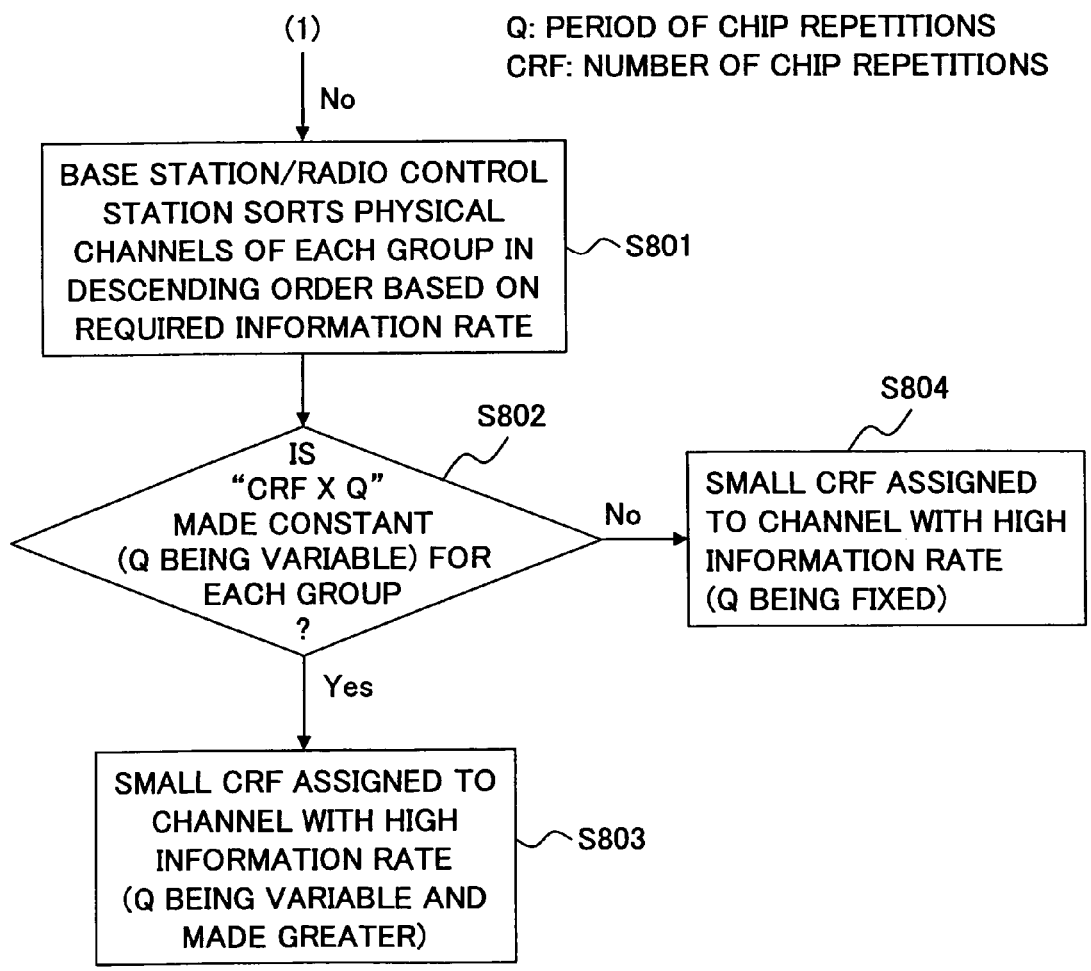
FIG. 8B is a flowchart that shows operations of determining the range in which the chip repetition factor is controlled.

Next, the control method of the chip repetition factor (CRF) in each physical channel is described with reference to FIGS. 7B and 8B.

First, the base station 100 or a radio control station (not illustrated) determines a range of independent control about the number of chip repetitions (Step S701). Then, the base station 100 or the radio control station, as applicable, maps physical channels into one or more groups based on the kind of a physical channel, an information rate, a traffic type, mobile station information, etc. (Step S702). Next, it is determined whether the same number of chip repetitions is to be assigned to all the physical channels of each group (Step S703).

When assigning the same number of chip repetitions to all the physical channels of each group (Step S703: Yes), a common number of chip repetitions is assigned to all the physical channels of each group (Step S704). Otherwise, if not assigning the same number of chip repetitions to all the physical channels of a group of all the groups (Step S703: No), the base station 100 or the radio control station, as applicable, sorts the physical channels of each group in a descending order based on required information rate (Step S801) as shown by FIG. 8B. Next, it is determined whether "the number of chip repetitions×Q" is made constant, where Q represents a period of chip repetitions, and Q is variable between the physical channels of each group (Step S802).

When the determination is affirmative (Step S802: Yes), a small number of chip repetitions is assigned to a channel with a high information rate (i.e., greater Q) (Step S803). In this way, the orthogonality in the frequency domain can be maintained between all the physical channels of the group.

Otherwise, if the determination is negative (Step S802: No), a small number of chip repetitions is assigned to a channel with a high information rate (Q being fixed) (Step S804). That is, although a channel requiring a high information rate can maintain the orthogonality in the frequency domain within each group, a channel that requires a low information rate cannot maintain the orthogonality in the frequency domain; accordingly, the spreading factor of the channel that requires a low information rate is increased.

Further, Step S704 of the control method of the chip repetition factor CRF of each physical channel described above may be structured such that the base station 100 or the radio control station assigns the number of chip repetitions that is unique to each group within the control range to all the physical channels of the group (Step S901) as shown in FIG. 9C.

For example, when the value of the unique number of chip repetitions of the predetermined range is set to 8, the number of chip repetitions is set to 8, 8, and 8 corresponding to 2, 4, and 8 simultaneously accessing mobile stations, respectively, in the predetermined range as shown in FIG. 9A. The numbers of chip repetitions presuppose that it is the same between all the physical channels in each group. In this case, when the number of accessing mobile stations is smaller than the number of chip repetitions, frequency multiplexing is carried out within one mobile station.

Further, when the value of the unique number of chip repetitions in the predetermined range is set to 2, as shown in FIG. 9B, the number of chip repetitions is set to 2, 2, and 2 to 2, 4, and 8 simultaneously accessing mobile stations, respectively, within the predetermined range. The numbers of chip repetitions presuppose that it is the same between all the physical channels in each group. In this case, when the number of accessing mobile stations is greater than the number of chip repetitions, code multiplexing among different mobile stations is carried out.

Figures 10A, 10B:
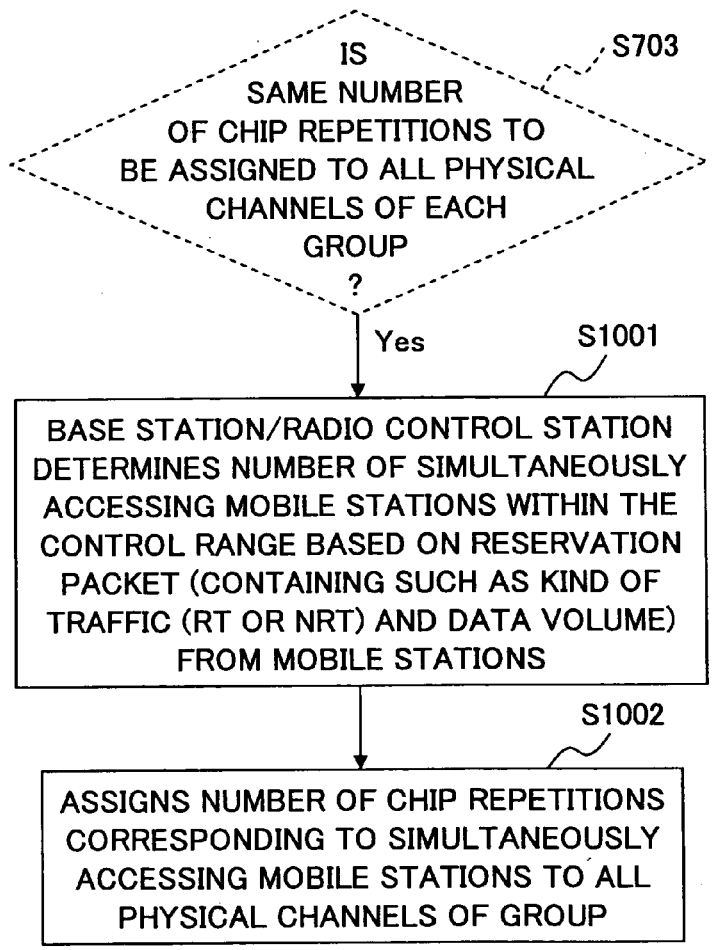
FIG. 10A is a table for explaining the operations of the base station of the radio communications system according to the embodiment of the present invention, wherein the number of chip repetitions is explained.
FIG. 10B is a flowchart that shows the operations of assigning the number of chip repetitions.

Further, Step S704 of the control method of CRF in each physical channel described above may be structured such that the base station 100 or the radio control station, as applicable, determines the number of simultaneously accessing mobile stations within each group (Step S1001) based on the number of the mobile stations within each group, information about a radio parameter of each mobile station, information about a propagation path condition of each mobile station, information about interference from an adjacent cell of each mobile station and the reservation packet provided by the mobile stations 10 and 200, the reservation packet containing information such as the kind of traffic (RT or NRT), and the amount of data, and assigns the number of chip repetitions corresponding to all the simultaneously accessing mobile stations to all the physical channels of the group (Step S1002) as shown in FIG. 10B.

For example, as shown in FIG. 10A, where the numbers of simultaneously accessing mobile stations within the predetermined group are set to 2, 4, and 8, the numbers of chip repetitions are set to 2, 4, and 8, respectively. The numbers of chip repetitions are commonly used by all the physical channels of each group.

Figures 11A, 11B:
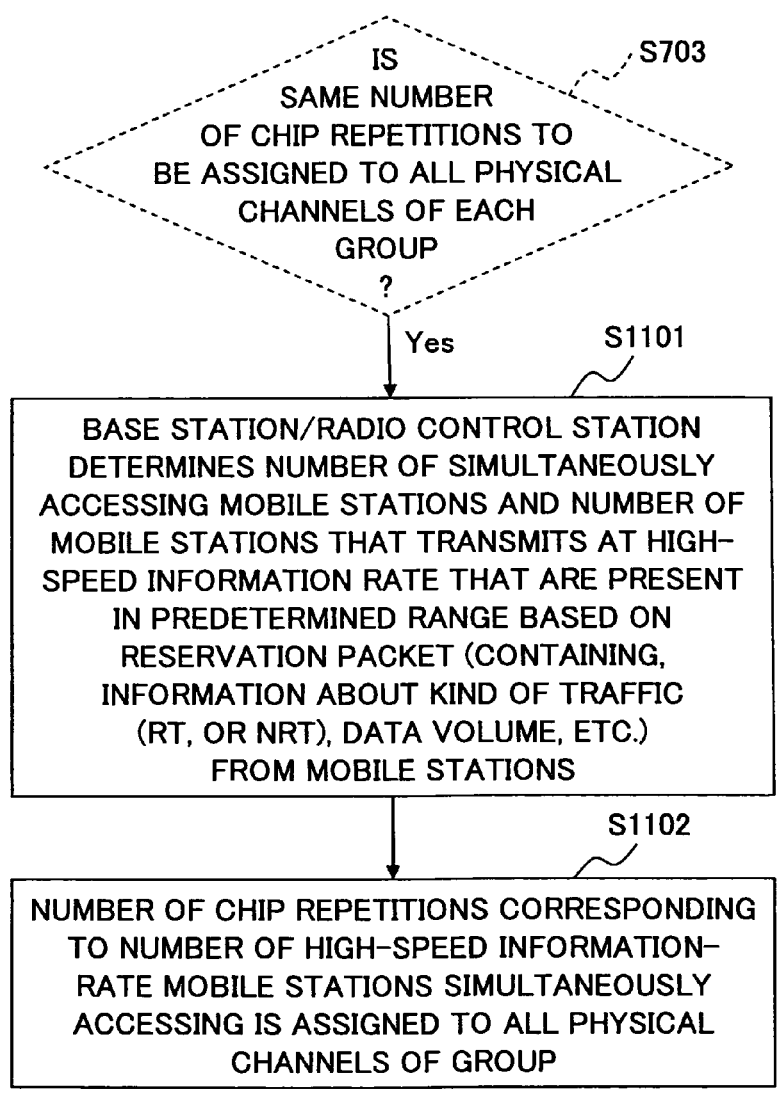
FIG. 11A is a table for explaining the operations of the base station of the radio communications system according to the embodiment of the present invention, wherein the number of chip repetitions is explained.
FIG. 11B is a flowchart that shows the operations of assigning the number of chip repetitions.

Further, Step S704 of the control method of the chip repetition factor of each physical channel described above may be structured such that the base station 100 or the radio control station determines the number of simultaneously accessing mobile stations and the number of mobile stations that transmit at a high-speed information rate that are present in the predetermined group based on the number of the mobile stations within each group, information about a radio parameter of each mobile station, information about a propagation path condition of each mobile station, information about interference from an adjacent cell of each mobile station and the reservation packet from the mobile stations 10 and 200, the reservation packet containing information about, for example, the kind of traffic (RT or NRT), and the amount of data (Step S1101) as shown in FIG. 11B, and the number of chip repetitions corresponding to the number of high-speed information-rate mobile stations simultaneously accessing is assigned to all the physical channels of the group (Step S1102).

For example, as shown in FIG. 11A, where the number of simultaneously accessing mobile stations within the predetermined group are set to 2, 4, 4, 8, and 8, and the number accessing mobile stations of high-speed rate within the predetermined group are set to 2, 2, 4, 4, and 8, respectively; the number of chip repetitions are set to 2, 2, 4, 4, and 8, respectively. The numbers of chip repetitions are commonly used by all the physical channels in each group. In this case, control is performed according to the number of simultaneously accessing mobile stations or the number of physical channels used at a high-speed rate.

Figure 12:
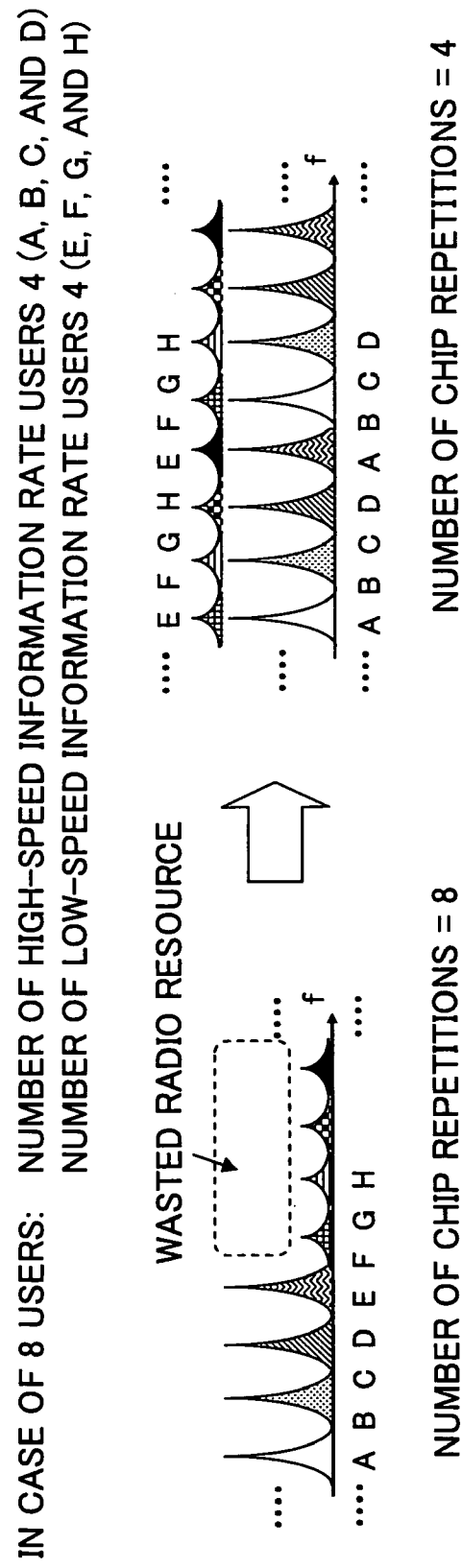
FIG. 12 is a frequency diagram for explaining the operations of the base station of the radio communications system according to the embodiment of the present invention.

Further, in this case, if there are four high-speed information-rate mobile stations A, B, C and D, and four low-speed information-rate mobile stations E, F, G, and H as shown in FIG. 12, the number of chip repetitions is changed to 4 from 8. In this way, the rate of the high-speed information-rate mobile station can be doubled, and the low-speed information-rate mobile stations and the high-speed information-rate mobile stations can be code multiplexed such that the radio resource can be efficiently allocated.

Figure 13:
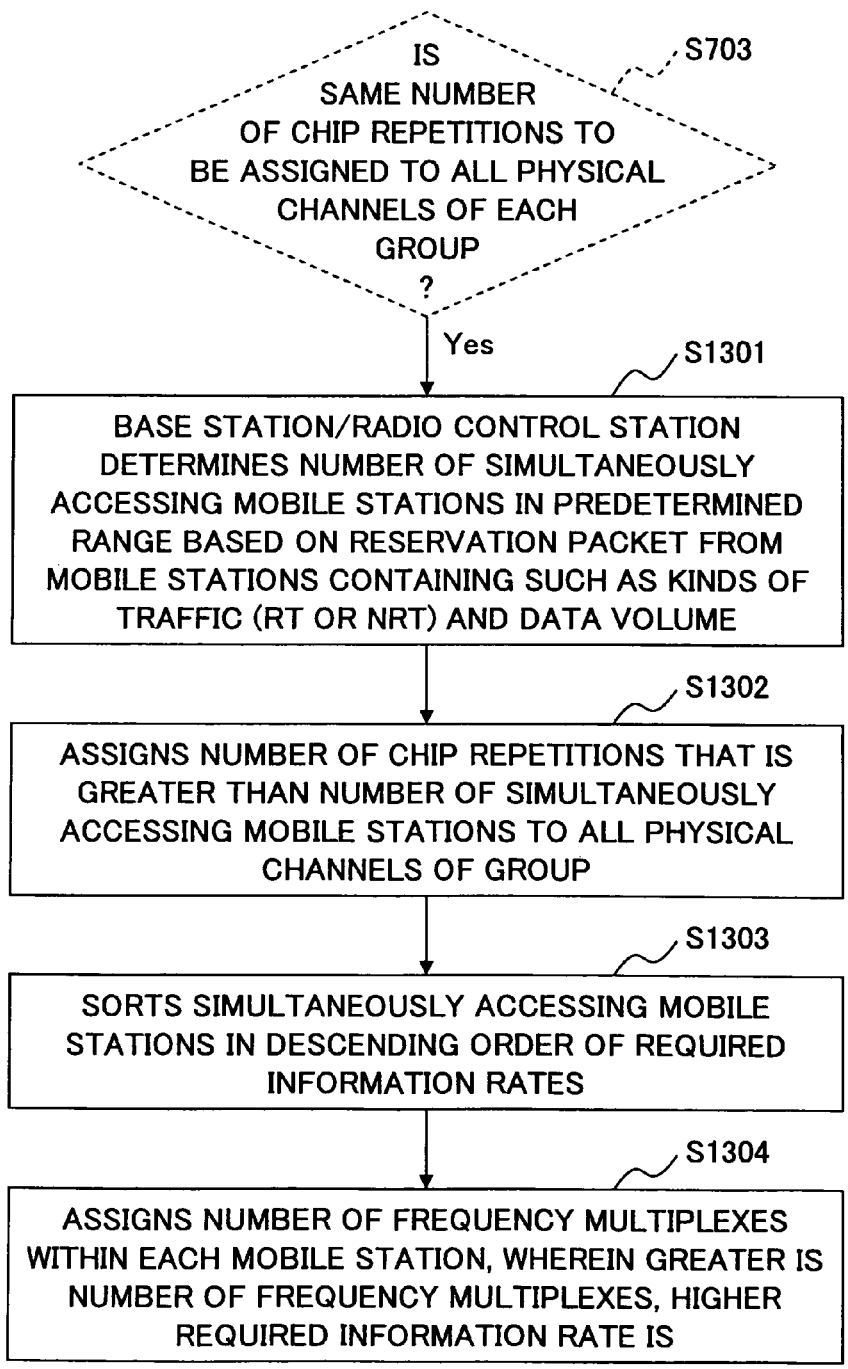
FIG. 13A is a table for explaining the operations of the base station of the radio communications system according to the embodiment of the present invention, wherein the number of chip repetitions is explained.
FIG. 13B is a flowchart that shows the operations of assigning the number of chip repetitions.

Further, Step S704 of the control method of the chip repetition factor of each physical channel described above may be structured such that the base station 100 or the radio control station, as applicable, determines the number of simultaneously accessing mobile stations in the predetermined group (Step S1301), assigns the number of chip repetitions, the number being greater than the number of simultaneously accessing mobile stations to all the physical channels of the group (Step S1302), sorts the simultaneously accessing mobile stations in the order of the required information rates (Step S1303), and assigns a number of frequency multiplexes within each mobile station, wherein the greater is the number of frequency multiplexes, the higher the required information rate is (Step 1304) as shown in FIG. 13B based on information about a radio parameter of each mobile station, information about a propagation path condition of each mobile station, information about interference from an adjacent cell of each mobile station and the reservation packet from the mobile stations 10 and 200, the reservation packet containing information about such as the kind of traffic (RT or NRT) and the amount of data.

For example, as shown in FIG. 13A, where the numbers of simultaneously accessing mobile stations within the predetermined group are 2, 4, and 8, the numbers of chip repetitions are set to 4, 8, and 16, respectively. The numbers of chip repetitions are commonly used by all the physical channels in each group. In this case, the number of chip repetitions is made to twice the number of simultaneously accessing mobile stations. In this way, the radio resources in the frequency domain for each mobile station can be variable by combining with frequency multiplexing within one mobile station.

Figure 14:
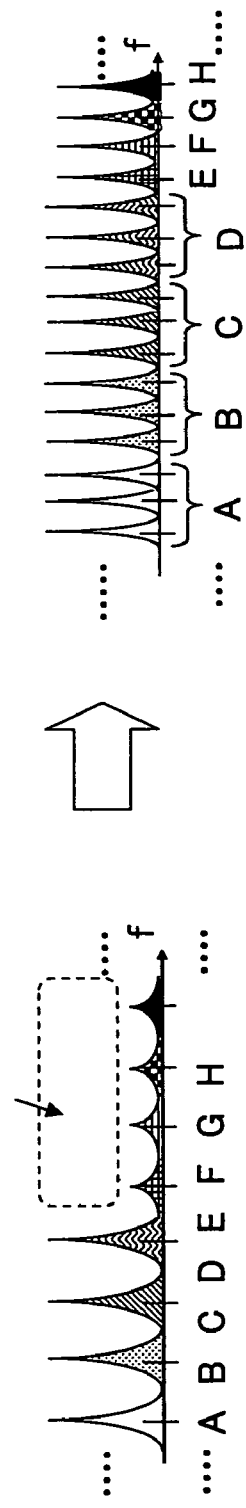
FIG. 14 is a frequency diagram for explaining the operations of the base station of the radio communications system according to the embodiment of the present invention.

Further, as shown in FIG. 14, if there are four high-speed information-rate mobile stations A, B, C and D, and four low-speed information-rate mobile stations E, F, G, and H, the number of chip repetitions is changed to twice the number of simultaneously accessing mobile stations. In this way, the interval between the comb-teeth can be made fine; and by carrying out frequency multiplexing within one mobile station, the radio resources can be efficiently used.

Next, a method to independently control the spreading factor and the number of code multiplexes of each physical channel for each physical channel is described. The spreading factor and number of chip repetitions determining unit of the base station 100 determines the number of chip repetitions, the guard interval length, and the phase sequence unique to each mobile station, then, controls the spreading factor and the number of code multiplexes such that each physical channel independently satisfies the required information rate of the physical channel.

As shown in FIG. 15B, the number of chip repetitions of each mobile station (i.e., each physical channel) is determined (Step S1501), the guard interval of the mobile station (the physical channel) is determined (Step S1502), and the unique phase of the mobile station (the physical channel) is determined (Step S1503).

On the other hand, the base station 100 or the radio control station determines the information rate of each physical channel based on the number of the mobile stations within each group, information about a radio parameter of each mobile station, information about a propagation path condition of each mobile station, information about interference from an adjacent cell of each mobile station and the reservation packet containing, for example, the kinds of traffic (RT or NRT) and the amount of data from the mobile stations 10 and 200. (Step S1504).

Next, the base station 100 or the radio control station determines the spreading factor and the number of code multiplexes that satisfy the required information rate of each physical channel in consideration of the number of chip repetitions and the guard interval that have been determined (Step S1505).

Next, a modulation technique and a channel encoding rate of each physical channel are determined according to an information rate and a receiving quality (Step S1506).

Here, the spreading factor determined at Step S1505 takes a great value when the information rate is low, and takes a small value when the information rate is high as shown in FIG. 15A. Further, if a spreading factor that satisfies the required information rate when the chip is not repeated is expressed by $SF_{DS}$, a spreading factor $SF_{VSCRF}$ that satisfies the required information rate when the chip is repeated is equal to $SF_{DS}/CRF$ if there is no guard interval.

Next, a method to control the spreading factor and the number of code multiplexes of each physical channel in order to satisfy a required receiving quality, for example, a packet error rate at a predetermined receiving $E_b/I_0$ or reception SIR (I including noise N), is described. The spreading factor and number of chip repetitions determining unit of the base station 100 determines the number of chip repetitions, the length of the guard interval, and the phase sequence unique to the mobile station, and then determines the spreading factor and the number of code multiplexes such that the required receiving quality, for example, the packet error rate are satisfied for each physical channel independently at the predetermined receiving $E_b/I_0$ or the reception SIR.

As shown in FIG. 16B, the number of chip repetitions of each mobile station (each physical channel) is determined (Step S1601), the guard interval of the mobile station (the physical channel) is determined (Step S1602), and the unique phase of the mobile station (the physical channel) is determined (Step S1603).

On the other hand, the base station 100 measures a condition of a selected receiving signal propagation path, power of "adjacent cell interference", etc., for each of the comb-teeth spectra, the number of the comb-teeth being equal to the number of the chip repetitions (Step S1604).

Next, the base station 100 or the radio control station determines the spreading factor and the number of code multiplexes that satisfy the required receiving quality of each physical channel based on the measured $E_b/I_0$ (Step S1605).

Next, a modulation technique and a rate of a channel encoding rate are determined according to an information rate and receiving quality of each physical channel. (Step S1606). Here, the spreading factor determined at Step S1605 takes a-great value when interference power is small, and takes a small value when the interference power is great as shown in FIG. 16A. Further, the spreading factor and the number of code multiplexes may be determined in reference to a table beforehand prepared in consideration of propagation path conditions (such as the number of multi-paths of a mobile station, a delay spread, and a Doppler frequency), and "adjacent cell interference" power.

Further, in addition to controlling the spreading factor, the modulation technique and the rate of channel encoding may be controlled according to the information rate as shown in FIG. 17A. In this case, when the information rate is high, the spreading factor is set to a small number, the modulation technique of 16QAM is used, and the encoding rate is set to a great number; and when the information rate is low, the spreading factor is set to a great number, the modulation technique of QPSK is used, and the encoding rate is set to a small number.

Further, as shown in FIG. 17B, the modulation technique and the rate of channel encoding may be controlled in addition to controlling the spreading factor according to the required quality, for example, in reference to interference power. In this case, when interference power is small, the spreading factor is set to a small number, the modulation technique of 16QAM is used, and the rate of encoding is set to a great number; and when the interference power is great, the spreading factor is set to a great number, the modulation technique of QPSK is used, and the rate of encoding is set to a small number.

Next, the case wherein frequency multiplexing is performed within a mobile station by assigning two or more unique phases to each of the mobile stations 10 and 200, i.e., per physical channel is described.

As shown in FIG. 18, the phase sequence generating unit 10-8 of the mobile station 10 assigns two or more unique phases to each mobile station, and performs frequency multiplexing of sequences of channels A and B after multiplying by the assigned phase sequences.

Figure 19:
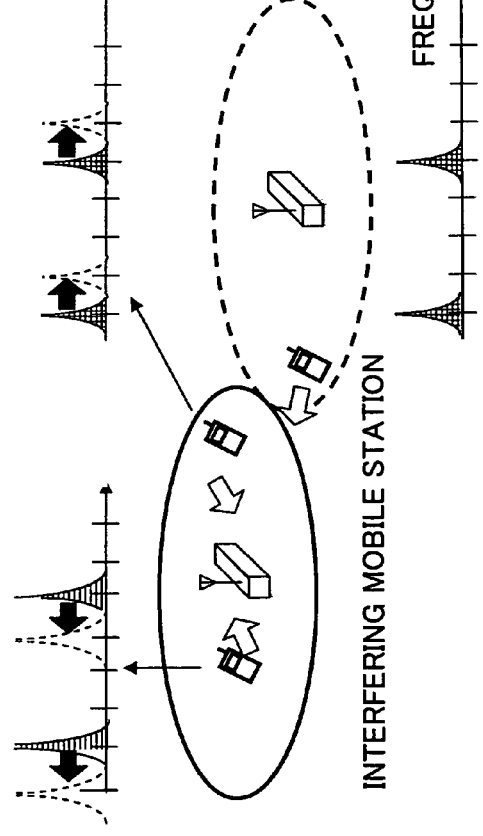
FIG. 19 is a schematic diagram for explaining the operations of the radio communications system according to the embodiment of the present invention.
Figure 20:
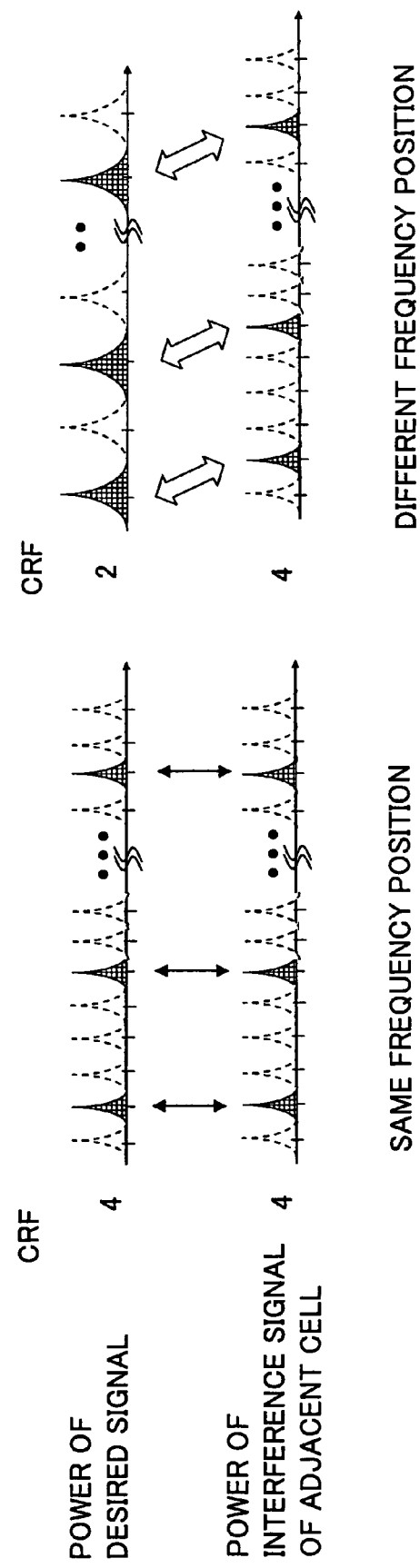
FIG. 20 gives frequency diagrams for explaining the operations of the radio communications system according to the embodiment of the present invention.

Next, controls that reduce interference of an adjacent cell are described with reference to FIG. 19 and FIG. 20.

First, the case wherein an arrangement of the comb-teeth is controlled in order to reduce the interference of the adjacent cell is described with reference to FIG. 19. If the interference power from the adjacent cell is great at a position of a comb-tooth, the phase sequence generating unit 10-8 of the mobile station 10 controls to change the position of the comb-tooth to a position with small interference power.

For example, if an open position of comb-teeth is available at a base station to which a mobile station A is communicating, the comb-tooth position of the mobile station A that is close to an interfering station is moved to the open position where the interference is small. If there is no open position available, the tooth position of the mobile station A and a tooth position of a mobile station B that is closer to the base station are exchanged (replaced with each other) such that the interference to the mobile station A that is closer to the interfering station is mitigated.

In this manner, the interference from the adjacent cell can be reduced by controlling the unique phase of the mobile station not to overlap with the comb-teeth of the adjacent cell that uses the same frequency, such that orthogonality by the chip repetition is made effective. Further, in this manner, the embodiments of the present invention can reduce interference by avoiding a situation wherein a mobile station in a cell and another mobile station in the adjacent cell, especially at cell edges, tend to transmit with great power. This reduces not only inter-cell interference, but also intra-cell interference.

Next, the case wherein the number of chip repetitions is controlled in order to reduce interference of the adjacent cell is described with reference to FIG. 20. The chip repetition unit 10-7 of the mobile station 10 is controlled to use the number of chip repetitions that is different from the number of chip repetitions of the adjacent cell. For example, the number of chip repetitions is changed to 2 from 4. In this way, the frequency position of the comb-teeth can be shifted, and the interference can be reduced between the adjoining cells.

Next, the case wherein the spreading factor value is controlled in order to reduce the interference of the adjacent cell is described. If the interference power from the adjacent cell is greater than the power of a desired signal at a comb-tooth position, the spreading code generating unit 10-3 of the mobile station 10 increases the value of the spreading factor. Since the information rate is lowered in this way, the spread spectrum gain is increased, and the interference from the adjacent cell can be reduced.

Next, the case wherein a Q value is controlled in order to reduce interference of the adjacent cell is described. If the Q value is the same as the adjacent cell, the chip repetition unit 10-7 is controlled to use a different Q value. In this way, the frequency position of the comb-teeth is shifted, and the influence of interference can be reduced.

Next, the case wherein the data modulation technique is changed in order to reduce interference of the adjacent cell is described. The data modulating unit 10-2 is controlled to use a modulation technique with fewer information bits per one symbol, such as QPSK, if the interference power from the adjacent cell is great with reference to the desired signal at a comb-tooth position. In this way, the information rate is lowered, and the interference from the adjacent cell can be reduced by using the data modulation technique that is strong against interference.

Next, the case wherein the rate of error correction encoding is controlled in order to reduce the interference of the adjacent cell is described. If the interference power from the adjacent cell is great in reference to the desired signal at a comb-tooth position, the error correction encoding unit 10-1 is controlled to decrease the rate of error correction encoding. In this way, the information rate is lowered, and the interference from the adjacent cell can be reduced by using the rate of error correction encoding that is strong against interference.

As described above, the control methods to reduce the interference from the adjacent cell include:
  changing the arrangement of the comb-teeth,
  changing the value of the number of chip repetitions,
  changing the value of the spreading factor,
  changing the value of Q,
  changing the data modulation technique, and
  changing the encoding rate of the error correcting code,
based on a measurement result measured by the base station about the interference from the adjacent cell. The control, nevertheless, may also be performed by any combination of at least two items described above.

Next, the case is described with reference to FIG. 21A and FIG. 21B, wherein mobile stations at the cell edge, i.e., cell circumference area of cells adjacent to each other are controlled not to use the same phase.

Figure 21A:
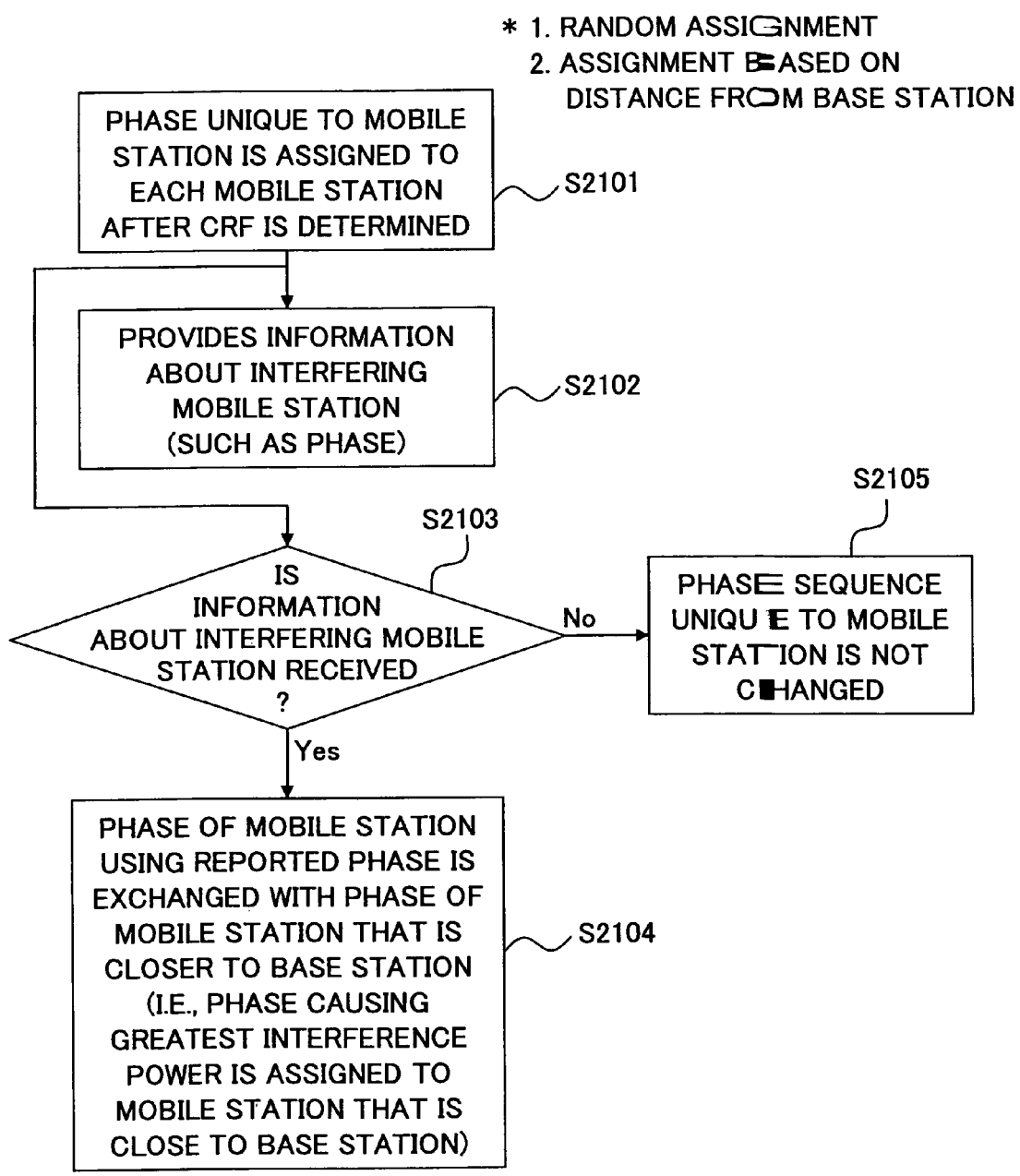
FIG. 21A is a flowchart for explaining the operations of the base station of the radio communications system according to the embodiment of the present invention, wherein the operations when controlling a phase sequence is shown.

As shown in FIG. 21A, after the number of chip repetition is determined, a unique phase of a mobile station is assigned to each mobile station (Step S2101). In this case, it may be assigned randomly, or based on the distance from the base station.

Next, information, such as phase, of an interfering mobile station positioned at the cell edge is reported (S2102)(FIG. 21B at (1)). On the other hand, it is determined whether information of the interfering mobile station is received (S2103).

If the information of the interfering mobile station is received (S2103: Yes), the phase of the mobile station A that receives interference from the reported phase is exchanged with a phase of a mobile station B that is closer to the base station (FIG. 21B at (2)). In this case, the phase at which the interference power is the greatest is assigned to the mobile station B that is the closest to the base station.

If the information of the interfering mobile station is not received (S2103: No), the phase sequences unique to the mobile stations are not changed.

Here, a measuring method of interference from the adjacent cell is described.

(a) When an uplink individual pilot channel is used,
  power of all the reception paths of all the mobile stations communicating with the base station is determined by the individual pilot channel, and the power is deducted from total received power.

(b) When the uplink individual pilot channel of only the mobile station using a given comb-tooth position is used,
  power of all the reception paths of the given comb-tooth position of a mobile station communicating with the base station is determined by the individual pilot channel, and the power is deducted from the total power of received signals after orthogonalizing the interval between comb-teeth of the received signals.

(c) When the uplink individual pilot channel of only the mobile station using a given comb-tooth position is used,
  power of all the reception paths of the given comb-tooth of a mobile station communicating with the base station is determined by the individual pilot channel, and the power is deducted from the distribution of the pilot symbol after orthogonalizing the interval between the comb-teeth.

(d) When an uplink common pilot channel is used,

Power of an "adjacent cell interference" signal is determined by carrying out reverse spread spectrum (slide correlation) of the common pilot channel unique to the cell.

Any one of the methods described above may be used to measure the interference of the adjacent cell.

Figure 22:
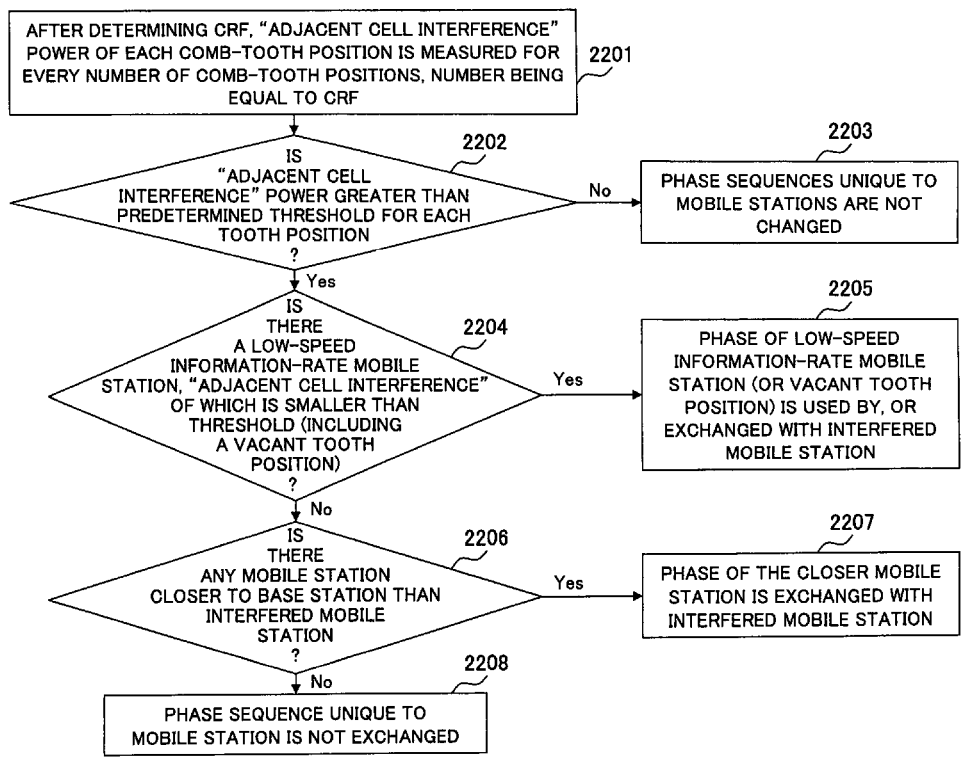
FIG. 22 is a flowchart for explaining the operations of the radio communications system according to the embodiment of the present invention.

Next, the case wherein each comb-tooth is moved in an independently-distributing manner to a phase where interference is small by measuring "adjacent cell interference" of the comb-tooth position is described with reference to FIG. 22.

The spreading factor and number of chip repetitions determining unit and the phase determining unit of the base station 100 controls exchanging of the phase sequences unique to mobile stations based on the "adjacent cell interference".

First, the number of chip repetitions (CRF) is determined, and the "adjacent cell interference" power is measured every certain number of comb-teeth positions, the certain number being equal to CRF (Step S2201). Next, it is determined for each tooth position whether the "adjacent cell interference" power is greater than a predetermined threshold (Step S2202).

If the "adjacent cell interference" power is not greater than the predetermined threshold for each tooth (Step S2202: No), phase sequences unique to the mobile stations are not changed (Step S2203). On the other hand, if the "adjacent cell interference" power is greater than the predetermined threshold (Step S2202: Yes), it is determined whether a low-speed information-rate mobile station, "adjacent cell interference" of which is smaller than the predetermined threshold (including a vacant tooth position) is present among the other mobile stations except for interfered-with mobile station (Step S2204) (interfered-with mobile station is the mobile station, "adjacent cell interference" of which is greater than the predetermined threshold).

If a low-speed information-rate mobile station having the "adjacent cell interference" smaller than the threshold is present, or a vacant tooth position is available (Step S2204: Yes), the phase of the low-speed information-rate mobile station (or the vacant tooth position) is used by, or exchanged with the interfered-with mobile station, (Step S2205). On the other hand, if a low-speed information-rate mobile station, "adjacent cell interference" of which is smaller than the threshold (or a vacant tooth position) is not present (Step S2204: No), it is determined whether there is any mobile station closer to the base station than the interfered-with mobile station (Step S2206).

If there is a mobile station that is closer to the base station than the interfered-with mobile station (Step S2206: Yes), the phase of the closer mobile station is exchanged with the interfered-with mobile station (Step S2207). On the other hand, if there is no mobile station that is closer to the base station than the interfered-with mobile station (Step S2206: No), the phase sequence unique to the mobile station is not exchanged (Step S2208). In this case, either the spectrum spreading is controlled such that the communication speed is lowered, or the service is suspended.

In this way, the mobile station can select a phase sequence that provides small "adjacent cell interference", avoiding selecting a phase sequence that is susceptible to large interference from the adjacent cell.

Here, in order to control the phase sequence unique to each mobile station, information may be exchanged between base stations, the information including the value of the number of chip repetitions, transmitted power of each comb-tooth position corresponding to the phase sequence, and phase information. Further, the base station may be configured to measure the interference power of each phase sequence from another cell.

Next, the case wherein two or more mobile stations having various information rates are accommodated in the radio communications system according to the embodiment is described.

The case wherein the number of chip repetitions (CRF) is made the same for all the mobile stations that simultaneously access is described. In this case, the information rate of each mobile station is adjusted by at least one of the spreading factor, the number of code multiplexes, the data modulation technique, and the encoding rate.

For example, if CRF is set at 2 for two mobile stations A and B as shown on the left hand side of FIG. 23, each mobile station uses 50% of the frequency bandwidth. If CRF is set at 4 for four mobile stations A, B, C, and D as shown on the right hand side of FIG. 23, each mobile station is assigned 25% of the frequency bandwidth.

Next, the case wherein different CRF values are assigned to mobile stations that simultaneously access is described. In this case, the information rate of each mobile station is adjusted by at least one of the number of chip repetitions, the spreading factor, the number of code multiplexes, the data modulation technique, and the rate of encoding.

For example, if CRF=2 is assigned to the mobile station A, CRF=4 is assigned to the mobile station B, CRF=8 is assigned to the mobile station C, and CRF=8 is assigned to the mobile station D as shown in FIG. 24, the mobile stations A, B, C and D share ½, ¼, ⅛, and ⅛, respectively, of the frequency bandwidth.

Next, the case wherein CRF is set to a value greater than the number of mobile stations that simultaneously access is described. In this case, the information rate of each mobile station is adjusted by at least one of the number of chip repetitions, the number of sets of comb-teeth to be used, the spreading factor, the number of code multiplexes, the data modulation technique, and the rate of encoding.

For example, if CRF is set to 8 for the all the mobile stations A, B, C, and D that are simultaneously accessing as shown in FIG. 25, the number of the comb-teeth sets is differentiated among the mobile stations. Specifically, for example, the mobile station A is assigned 4 sets, the mobile station B is assigned 2 sets, the mobile station C is assigned 1 set, and the mobile station D is assigned 1 set. In this case, the mobile stations A, B, C, and D use ½, ¼, ⅛, and ⅛, respectively, of the frequency bandwidth.

Figure 26A:
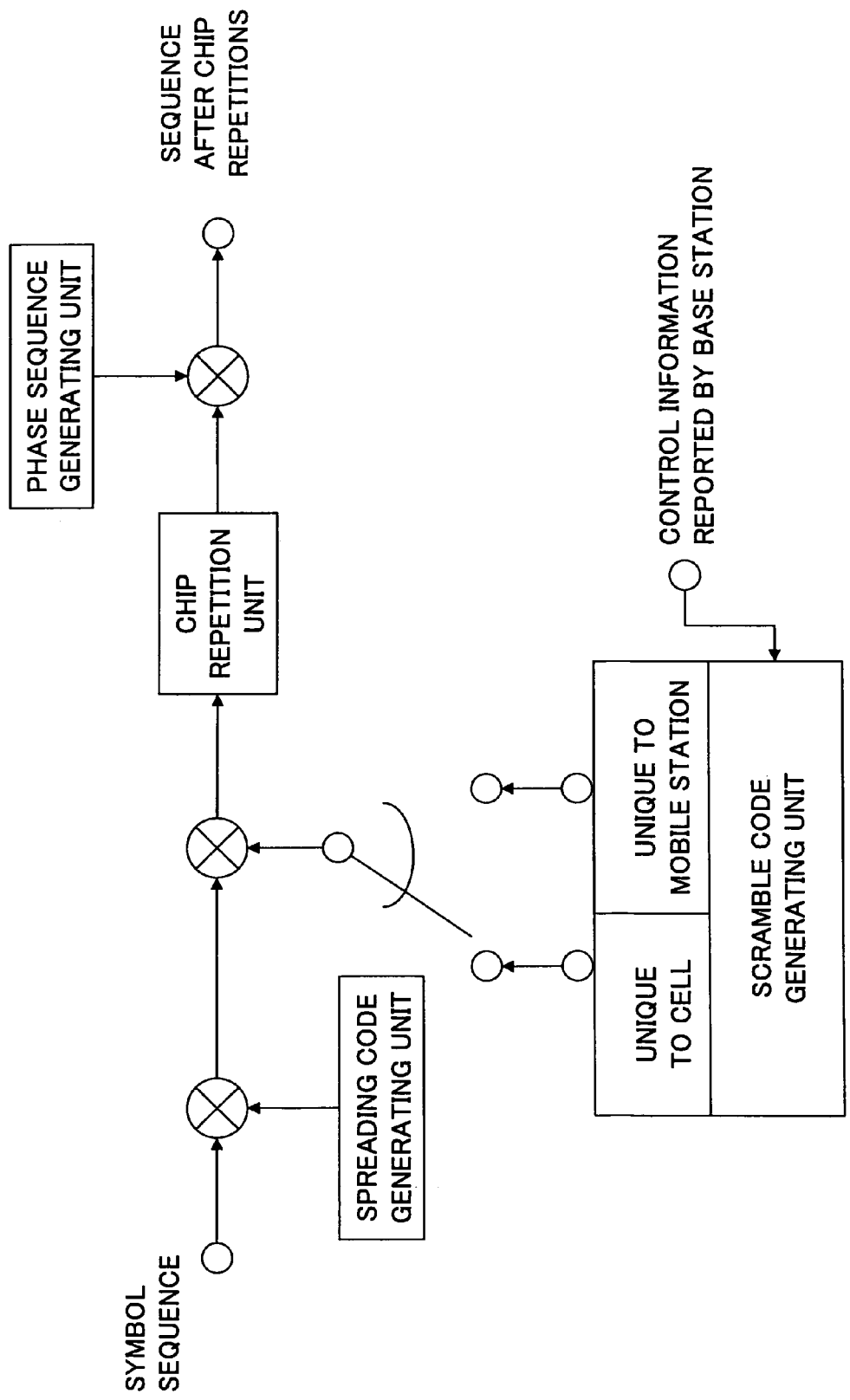
FIG. 26A is a block diagram for explaining the operations of the mobile station of the radio communications system according to the embodiment of the present invention.

Next, the scramble code generating unit 10-5 of the mobile station 10 of the radio communications system according to the embodiment of the present invention is described. As shown in FIG. 26A, the scramble code generating unit 10-5 selects one of a scramble code unique to a cell and a scramble code unique to a mobile station based on the control information provided by the base station 100. By applying the selected scramble code, randomization of the "adjacent cell interference" i.e., smoothing in the frequency domain is obtained.

Figure 26B:
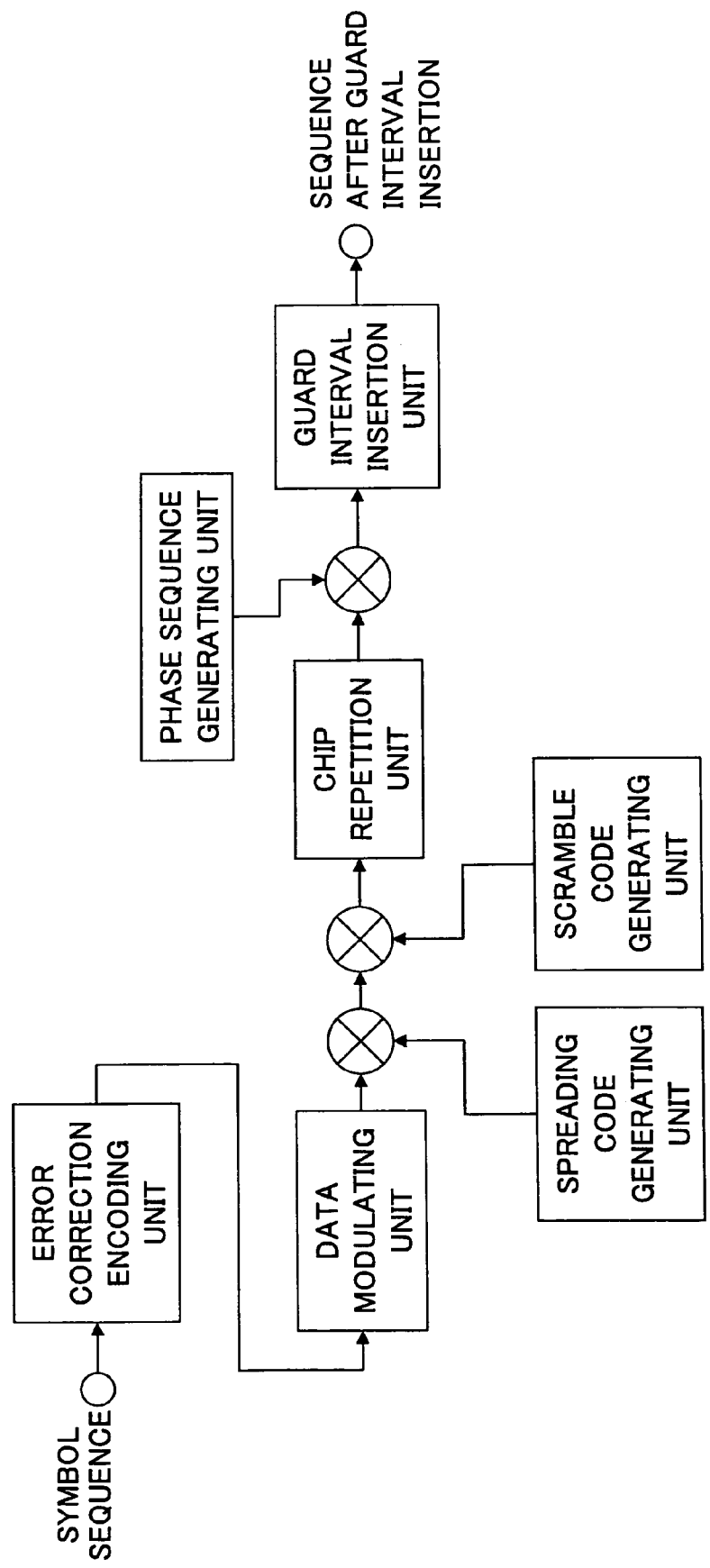
FIG. 26B is a block diagram showing the structure of guard interval insertion unit.

Next, the guard interval is described. As shown in FIG. 26B, a guard interval inserting unit is applied after multiplying phase sequence. The guard interval length is fixed length within entirety of a cellular system or variable length according to the various conditions.

If the guard interval length is fixed length within entirety of a cellular system, the guard interval length is determined cell radius, delay spread, and allowable different receiving timings at the base station of the signals transmitted from the different mobile station which is applied to transmission timing control.

Next, The guard interval length is variable length according to the various conditions. Here, the case wherein the guard interval length is determined according to the cell structure and the cell radius is described. In this case, the smaller the cell radius is, the smaller the guard interval length is made. If the maximum delay wave of different mobile stations falls within the guard interval, the orthogonality between the mobile stations in the frequency domain is perfectly maintained. For this reason, the guard interval is enlarged when the cell radius is great, and the guard interval is made small when the cell radius is small. Here, when the guard interval is made small, it includes that there is no guard interval.

As shown in FIG. 27A, a delay spread becomes small when the cell radius is small; accordingly, the guard interval is made small. Further, since the delay spread becomes great when the cell radius is great, the guard interval is enlarged.

Next, a method to arrange the guard interval is described with reference to FIG. 27B.

First, the base station 100 or the radio control station recognizes the cell radius of the base station or the radio control station, as applicable (Step S2701). Then, the guard interval length corresponding to the cell radius is uniformly assigned to all accessing mobile stations every fixed repetition patterns (Q×the number of chip repetitions) based on a table beforehand prepared (Step S2702).

Next, the case where the guard interval length is determined according to the size of a predetermined repetition pattern is described. In this case, the guard interval length is made small, if the predetermined repetition pattern is small.

Figure 28A:
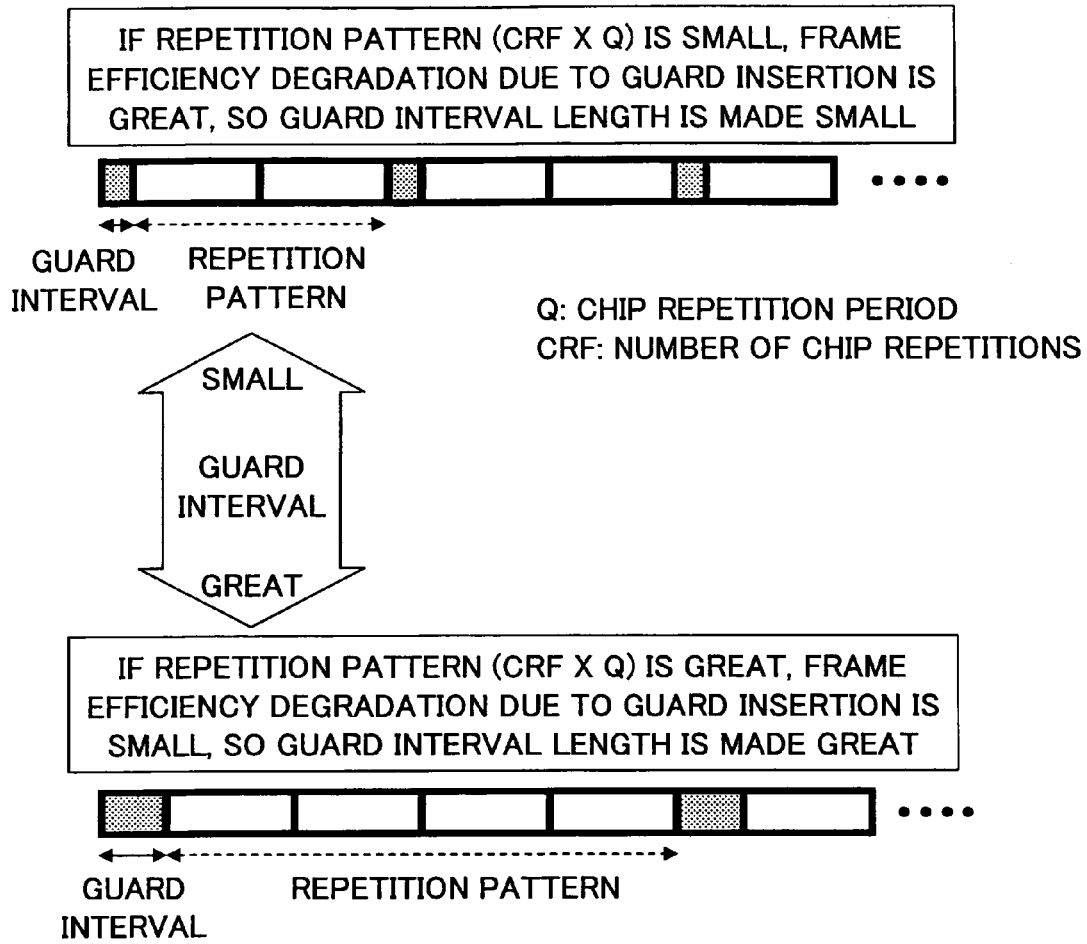
FIG. 28A is a chart for explaining the operations of the base station of the radio communications system according to the embodiment of the present invention, wherein control of guard interval length is shown.

For example, as shown in FIG. 28A, the frame efficiency is degraded by inserting a guard interval. The greater the degradation is, the smaller the repetition pattern (i.e., Q×the number of chip repetitions). Accordingly, when the repetition pattern is small, the guard interval length is made small. Conversely, the smaller the degradation is, the greater the repetition pattern (i.e., Q×the number of chip repetitions) is. Accordingly, the guard interval length is enlarged, when the repetition pattern (i.e., Q×the number of chip repetitions) is great. Here, when making the guard interval small, it includes where there is no guard interval.

Figure 28B:
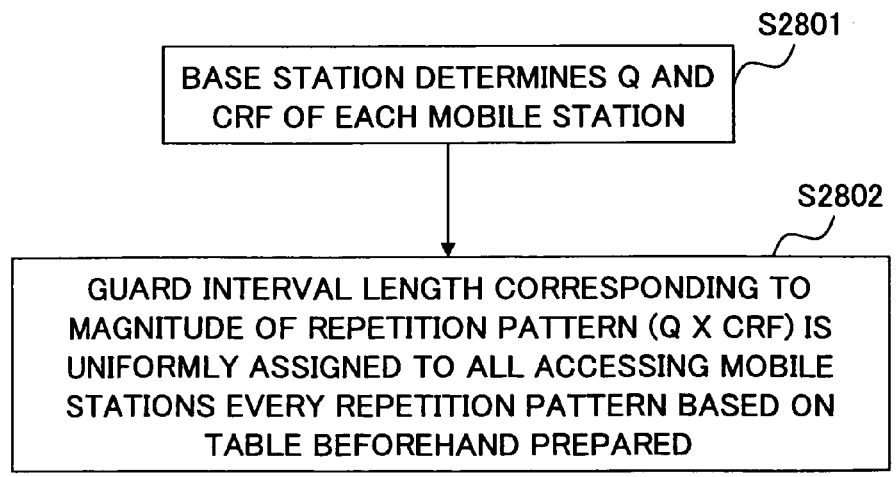
FIG. 28B is a flowchart for explaining the operations when controlling the guard interval length.

Next, a method to arrange a guard interval is described with reference to FIG. 28B.

First, the base station determines Q and the number of chip repetitions of each mobile station (Step S2801). Then, a guard interval length corresponding to the magnitude of the repetition pattern (i.e., Q×the number of chip repetitions) is uniformly assigned to all the accessing mobile stations every repetition pattern (i.e., Q×the number of chip repetitions) based on a table beforehand prepared (Step S2802).

Next, the case where guard interval length is determined according to the size of the repetition pattern is described. In this case, the guard interval length is enlarged if the repetition pattern is small.

Figure 29A:
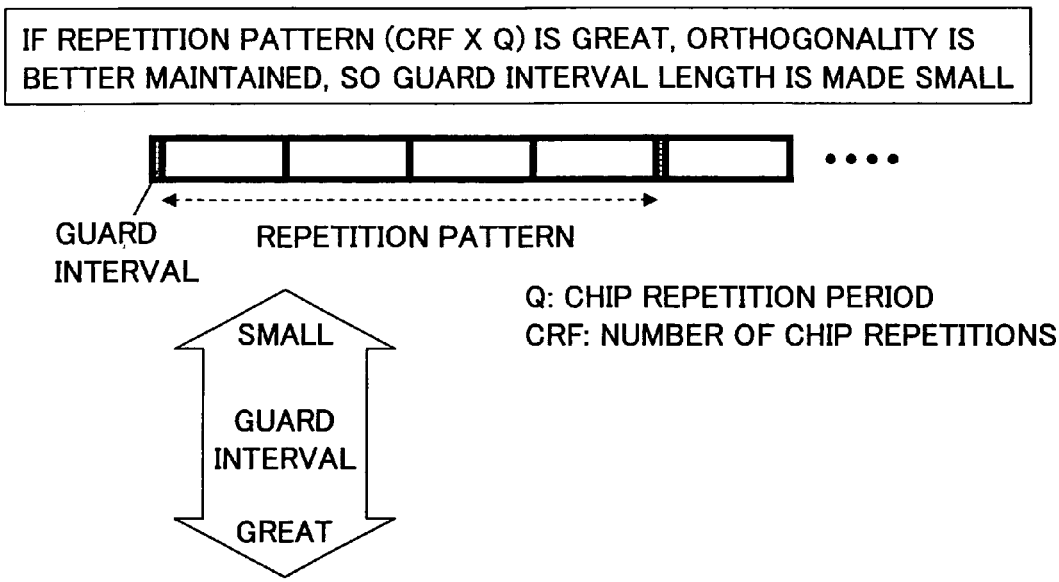
FIG. 29A is a chart for explaining the operations of the base station of the radio communications system according to the embodiment of the present invention, wherein control of guard interval length is shown.

For example, as shown in FIG. 29A, the greater the repetition pattern (Q×number of chip repetitions) is, the better the orthogonality in the frequency domain is maintained; accordingly, the guard interval length is made small, when the repetition pattern (Q×the number of chip repetitions) is great. Conversely, the smaller the repetition pattern (Q×the number of chip repetitions) is, the poorer the orthogonality in the frequency domain is maintained; accordingly, the guard interval length is enlarged, when the repetition pattern (Q×the number of chip repetitions) is small. Here, the guard interval being made small includes there being no guard interval.

Figure 29B:
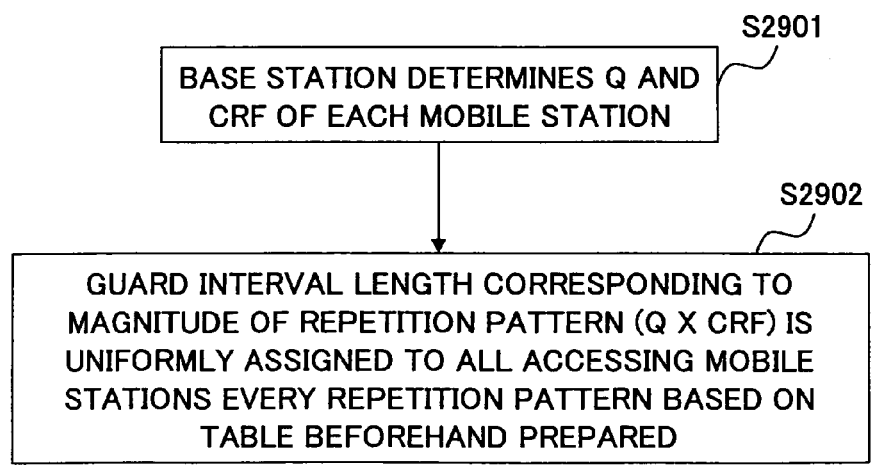
FIG. 29B is a flowchart for explaining the operations when controlling the guard interval length.

Next, a method to arrange a guard interval is described with reference to FIG. 29B.

First, the base station determines Q and the number of chip repetitions of each mobile station (Step S2901). Next, the guard interval length corresponding to the size of the repetition pattern (Q×the number of chip repetitions) is uniformly assigned to all the accessing mobile stations every fixed repetition pattern (Q×the number of chip repetitions) based on a table prepared beforehand (Step S2902).

In addition to the methods described above, the guard interval length may be determined based on (a) the magnitude of the multi-path delay time in the cell, (b) the number of mobile stations in the cell, (c) the number of chip repetitions, and (d) data modulation technique and the rate of channel encoding.

About (a), the guard interval is enlarged, if the multi-path delay time is great. In this way, inter-block interference and multiple-access interference by the great multi-path delay can be reduced.

About (b), the guard interval is enlarged if the number of mobile stations in a cell is great. In this way, the multiple-access interference by the large number of mobile stations can be reduced.

About (c), the guard interval is enlarged if the number of chip repetitions is small. Since the chip pattern length becomes short in this way, deterioration of the orthogonality in the frequency domain by the relative delay appearing to be great is reduced. Further, the guard interval is enlarged if the number of chip repetitions is great. In this way, degradation of the frame efficiency by insertion of the guard interval can be reduced.

About (d), the guard interval is enlarged if the rate of channel encoding is great in the case that a multi-level modulation, for example, 16QAM etc., is used. When using a combination of the rate of channel encoding and the modulation technique weak against interference, reduction of interference is obtained by the guard interval in this manner.

Next, the case wherein the guard interval is inserted every certain repetition pattern is described.

By inserting a guard interval every certain repetition pattern, as shown in FIG. 30, the multiple-access interference can be reduced, and the interference between blocks of the repetition patterns can be reduced.

According to the radio communications system of the present invention as described above, the system throughput is improved by adaptively adjusting and controlling the spreading factor and the chip repetition factor with the same interface in various different environments, for example, multi-cell environment by using VSCRF-CDMA (Variable Spreading and Chip Repetition Factors-CDMA).

INDUSTRIAL APPLICABILITY

The base station, the mobile station, the radio communications system, and the radio transmission method according to the present invention are applicable to radio communications systems in multi-cell environments.

Further, the present invention is not limited to these embodiments, but variations and modifications may be made without departing from the scope of the present invention.

The present application is based on Japanese Priority Application No. 2004-063179 filed on Mar. 5, 2004 with the Japanese Patent Office, the entire contents of that are hereby incorporated by reference.

What is claimed is:

1. A mobile station, comprising: a generating unit configured to generate a signal by allocating a signal having a spectrum in a shape of comb-teeth on a frequency axis or a signal assigned to a predetermined band on the frequency axis based on a kind of a physical channel; and a transmitting unit configured to transmit to a base station the signal generated by the generating unit wherein the generating unit generates a signal in which a comb-teeth interval is constant regardless of the number of mobile stations accessing the base station, upon allocating the signal having the spectrum in the shape of comb-teeth on the frequency axis.

2. A mobile station, comprising: a generating unit configured to generate a signal by allocating a signal having a spectrum in a shape of comb-teeth on a frequency axis or a signal assigned to a predetermined band on the frequency axis based on a kind of a physical channel; and a transmitting unit configured to transmit to a base station the signal generated by the generating unit wherein the generating unit inserts a guard interval with a guard interval length which is determined by the base station based on at least one of a cell structure; a radius of a cell; a magnitude of multi-path delay in the cell; and the number of mobile stations in the cell.

3. A mobile station, comprising: an inputting unit configured to input an information sequence to be transmitted; a generating unit configured to generate a sequence after repetition by performing repetitions for the information sequence input by the inputting unit for a predetermined number of repetitions; and a transmitting unit configured to transmit to a base station the sequence generated by the generating unit; wherein the generating unit determines the number of repetitions based on a kind of a physical channel wherein the generating unit uses a fixed number of repetitions regardless of the number of mobile stations accessing the base station.

4. A mobile station, comprising: an inputting unit configured to input an information sequence to be transmitted; a generating unit configured to generate a sequence after repetition by performing repetitions for the information sequence input by the inputting unit for a predetermined number of repetitions; and a transmitting unit configured to transmit to a base station the sequence generated by the generating unit; wherein the generating unit determines the number of repetitions based on a kind of a physical channel wherein the generating unit inserts a guard interval with a guard interval length which is determined by the base station based on at least one of a cell structure; a radius of a cell; a magnitude of multi-path delay in the cell; and the number of mobile stations in the cell.

5. A radio communications system comprising: a mobile station; and a base station; wherein the mobile station includes a generating unit configured to generate a signal by allocating a signal having a spectrum in a shape of comb-teeth on a frequency axis or a signal assigned to a predetermined band on the frequency axis based on a kind of a physical channel; and a transmitting unit configured to transmit to the base station the signal generated by the generating unit; and the base station includes a receiving unit configured to receive the signal transmitted from the transmitting unit wherein the generating unit generates a signal in which a comb-teeth interval is constant regardless of the number of mobile stations accessing the base station, upon allocating the signal having the spectrum in the shape of comb-teeth on the frequency axis.

6. A radio communications system comprising: a mobile station; and a base station; wherein the mobile station includes a generating unit configured to generate a signal by allocating a signal having a spectrum in a shape of comb-teeth on a frequency axis or a signal assigned to a predetermined band on the frequency axis based on a kind of a physical channel; and a transmitting unit configured to transmit to the base station the signal generated by the generating unit; and the base station includes a receiving unit configured to receive the signal transmitted from the transmitting unit wherein the generating unit inserts a guard interval with a guard interval length which is determined by the base station based on at least one of a cell structure; a radius of a cell; a magnitude of multi-path delay in the cell; and the number of mobile stations in the cell.

7. A radio communications system, comprising:
a mobile station; and
a base station;
wherein the mobile station includes
an inputting unit configured to input an information sequence to be transmitted;
a generating unit configured to generate a sequence after repetition by performing repetitions for the information sequence input by the inputting unit for a predetermined number of repetitions; and
a transmitting unit configured to transmit to the base station the sequence generated by the generating unit;
wherein the generating unit determines the number of repetitions based on a kind of a physical channel,
and the base station includes
a receiving unit configured to receive the signal transmitted from the transmitting unit.

8. The radio communications system as claimed in claim 7, wherein the generating unit uses a fixed number of repetitions regardless of the number of mobile stations accessing the base station.

9. The radio communications system as claimed in claim 7, wherein the generating unit also carries out a code multiplexing process.

10. The radio communications system as claimed in claim 7, wherein the generating unit inserts a guard interval with a guard interval length which is determined by the base station based on at least one of
a cell structure;
a radius of a cell;
a magnitude of multi-path delay in the cell; and
the number of mobile stations in the cell.

* * * * *